United States Patent
Imazaki et al.

(10) Patent No.: US 10,067,882 B2
(45) Date of Patent: Sep. 4, 2018

(54) STORAGE SYSTEM AND STORAGE CONTROL METHOD

(71) Applicant: Hitachi, Ltd., Tokyo (JP)

(72) Inventors: Miho Imazaki, Tokyo (JP); Akira Yamamoto, Tokyo (JP); Yusuke Nonaka, Tokyo (JP); Tomohiro Yoshihara, Tokyo (JP); Shunji Kawamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/540,681

(22) PCT Filed: Jan. 13, 2015

(86) PCT No.: PCT/JP2015/050582
§ 371 (c)(1),
(2) Date: Jun. 29, 2017

(87) PCT Pub. No.: WO2016/113831
PCT Pub. Date: Jul. 21, 2016

(65) Prior Publication Data
US 2018/0004676 A1    Jan. 4, 2018

(51) Int. Cl.
*G06F 11/10* (2006.01)
*G06F 12/109* (2016.01)

(52) U.S. Cl.
CPC ........ *G06F 12/109* (2013.01); *G06F 11/1076* (2013.01); *G06F 2212/1008* (2013.01); *G06F 2212/262* (2013.01); *G06F 2212/657* (2013.01)

(58) Field of Classification Search
None
See application file for complete search history.

(56) References Cited

U.S. PATENT DOCUMENTS

| 8,775,723 B2 * | 7/2014 | Suzuki | G06F 12/0246 711/103 |
| 2005/0228949 A1 * | 10/2005 | Yamamoto | G06F 3/0605 711/114 |

(Continued)

FOREIGN PATENT DOCUMENTS

| JP | 2005-202942 A | 7/2005 |
| JP | 2008-102819 A | 5/2008 |

OTHER PUBLICATIONS

International Search Report of PCT/JP2015/050582 dated Mar. 17, 2015.

(Continued)

*Primary Examiner* — Mano Padmanabhan
*Assistant Examiner* — Jean C Edouard
(74) *Attorney, Agent, or Firm* — Mattingly & Malur, PC

(57) ABSTRACT

A storage system manages correspondence relationships between physical addresses and logical addresses inside a storage device, as well as logical spaces provided by a plurality of storage devices, and when a determination is made as to whether first data and second data are stored in the same storage device in a case in which the first data and the second data are exchanged inside a logical space, and the determination is found to be affirmative, the storage device replaces the logical address corresponding to the first data with the logical address corresponding to the second data without changing the physical address of the physical area in which the first data is stored and the physical address of the physical area in which the second data is stored.

13 Claims, 20 Drawing Sheets

(56) References Cited

U.S. PATENT DOCUMENTS

| | | | |
|---|---|---|---|
| 2005/0231765 A1 | 10/2005 | So et al. | |
| 2007/0067588 A1* | 3/2007 | Kano | G06F 3/0605 711/162 |
| 2008/0098158 A1 | 4/2008 | Kitahara | |
| 2008/0263289 A1* | 10/2008 | Hosoya | G06F 3/0619 711/154 |
| 2009/0113152 A1* | 4/2009 | Eguchi | G06F 11/1451 711/162 |
| 2010/0011185 A1* | 1/2010 | Inoue | G06F 3/0605 711/172 |
| 2010/0017577 A1* | 1/2010 | Fujimoto | G06F 3/0608 711/165 |
| 2010/0070731 A1* | 3/2010 | Mizuno | G06F 1/3203 711/170 |
| 2011/0060887 A1* | 3/2011 | Thatcher | G06F 3/0604 711/171 |
| 2011/0066793 A1* | 3/2011 | Burd | G06F 11/1028 711/103 |
| 2011/0258405 A1* | 10/2011 | Asaki | G06F 3/061 711/162 |
| 2012/0005668 A1* | 1/2012 | Serizawa | G06F 12/0866 718/1 |
| 2012/0011321 A1* | 1/2012 | Matsunami | G06F 3/0611 711/114 |
| 2012/0011340 A1* | 1/2012 | Flynn | G06F 12/0246 711/171 |
| 2012/0260038 A1* | 10/2012 | Imazaki | G06F 3/0608 711/114 |
| 2013/0042049 A1 | 2/2013 | Fiske et al. | |
| 2013/0086304 A1* | 4/2013 | Ogawa | G06F 3/061 711/103 |
| 2013/0290773 A1 | 10/2013 | Yoshihara | |
| 2014/0359238 A1* | 12/2014 | Imazaki | C09K 5/16 711/162 |
| 2015/0378613 A1* | 12/2015 | Koseki | G06F 3/0608 711/103 |

OTHER PUBLICATIONS

Japanese Office Action received in corresponding Japanese Application No. 2016-569139 dated May 22, 2018.

* cited by examiner

PG management information (ID:0) 122

| Logical VOL ID (124) | RAID configuration (126) | Drive ID (128) | Physical start address (130) |
|---|---|---|---|
| 0 | RAID5 (3D+1P) | 0 | 0x0000 |
| | | 1 | 0x0000 |
| | | 2 | 0x0000 |
| | | 3 | 0x0000 |
| 1 | RAID5 (3D+1P) | 0 | 0x1000 |
| | | 1 | 0x1000 |
| | | 2 | 0x1000 |
| | | 3 | 0x1000 |
| ⋮ | | | |

132

| Logical VOL ID (134) | Stripe group ID (136) | Parity storage drive ID (138) |
|---|---|---|
| 0 | 0 | 3 |
| | 1 | 2 |
| | 2 | 1 |
| ⋮ | | |

Fig. 4

| Logical VOL ID | Logical start address | PG ID |
|---|---|---|
| 0 | 0x0000 | 0 |
| 1 | 0x1000 | 0 |
| ⋮ | ⋮ | ⋮ |

Logical VOL management table (72), columns 140, 142, 144

Fig. 5

STORAGE SYSTEM AND STORAGE CONTROL METHOD

TECHNICAL FIELD

The present invention relates to, in general, techniques for storage system and a storage control method.

BACKGROUND ART

A storage system is known in which a plurality of flash memory packages (hereinafter referred to as "FM packages") form a parity group in order to enhance redundancy of data. The FM package is a storage device equipped with a plurality of flash memory chips (hereinafter referred to as "FM chips"). PTL 1 describes a storage system that allows the FM package to execute a parity generation process when data related to a write request received from a host is stored in the FM package.

CITATION LIST

Patent Literature

[PTL 1]
US 2013/0290773

SUMMARY OF INVENTION

Technical Problem

Data included in a file (hereinafter referred to as "file data") may be fragmented through repeated writes, erases, and the like of the file data. The fragmented file data reduces the speeds of a file write process and a file read process.

A defragmentation process is a process of marshaling a plurality of fragmented data included in the file data, typically, a process of consecutively rearranging the plurality of fragmented data. In general, a storage system has a parity group (also referred to as a RAID (Redundant Array of Independent (or Inexpensive) Disks) group) including a plurality of storage devices, and a storage controller that controls the parity group. The parity group has a plurality of stripe groups. Each of the stripe group strides over a plurality of storage devices, and specifically, each of the storage devices is configured of the plurality of stripe groups. When a RAID level needs parities as is the case with RAID5 or RAID6, the storage controller needs to update the parities in the defragmentation process by reading a plurality of data in the stripe group to which migrated data belongs. In this regard, the stripe group is a group to which a group of data (a plurality of data) corresponding to a unit of parity generation belongs.

Furthermore, the storage controller needs to transfer updated parities to a storage device having un-updated parities and to exchange the un-updated parities for the updated parities. Therefore, execution of the defragmentation process may increase a processing load on the storage controller and also increase a communication load between the storage controller and the storage devices. The increase in processing load on the storage controller or the increase in communication load between the storage controller and the storage devices is not limited to the case of the defragmentation process but may occur in any processes involving data migration.

Thus, an object of the present invention is to provide a storage system and a storage control method that suppress an increase in processing load on a storage controller in a process involving data migration. Furthermore, an object of the present invention is to provide a storage system and a storage control method that suppress an increase in communication load between a storage controller and storage devices.

Solution to Problem

A storage system according to an embodiment has a plurality of storage devices and a storage controller that controls the plurality of storage devices. Each of the plurality of storage devices provides a sub logical space to the storage controller and manages correspondence relations between logical addresses and physical addresses in each of the storage devices. The storage controller manages a logical space that is a space based on the plurality of sub logical spaces provided by the respective storage devices. When exchanging first data that is one of a plurality of data in the logical space for second data that is one of the plurality of data, the storage controller makes a first determination to determine whether or not the first data and the second data are stored in the same storage device.

When a result of the first determination is affirmative, the storage device replaces a logical address corresponding to the first data with a logical address corresponding to the second data without changing a physical address of a physical area where the first data is stored and a physical address of a physical area where the second data is stored.

Advantageous Effects of Invention

According to the present invention, in a process involving data migration, an increase in processing load on the storage controller can be suppressed. Furthermore, according to the present invention, in a process involving data migration, an increase in communication load between the storage controller and the storage devices can be suppressed.

BRIEF DESCRIPTION OF THE DRAWINGS

FIG. 4 is a diagram illustrating a data configuration example of PG management information according to Embodiment 1.

FIG. 5 is a diagram illustrating a data configuration example of a logical VOL management table according to Embodiment 1.

DESCRIPTION OF EMBODIMENTS

Figure 1:
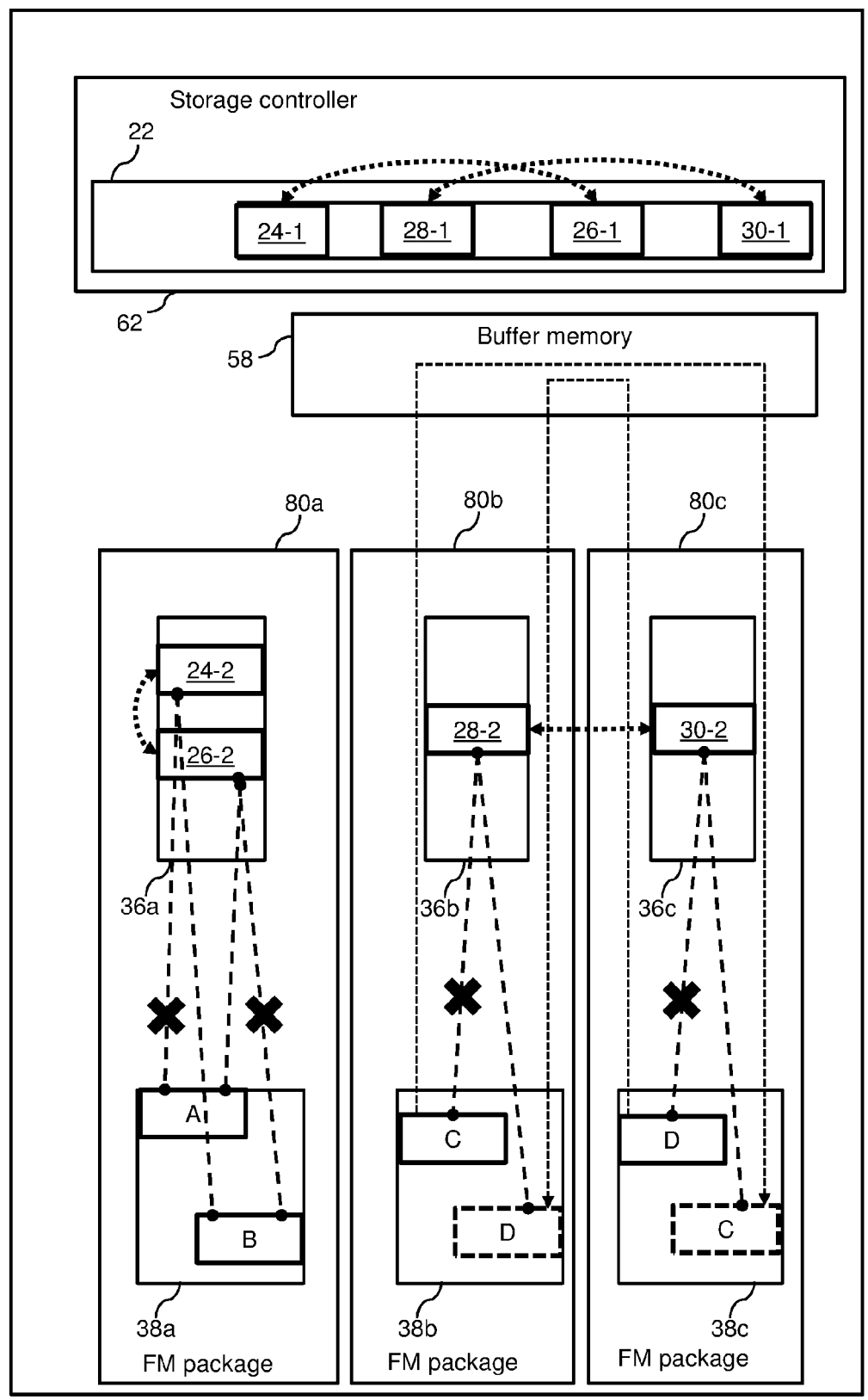
FIG. 1 is a schematic diagram schematically illustrating Embodiment 1.

An embodiment will be described below. Information will hereinafter be described using an expression such as an "xxx table", an "xxx queue", or an "xxx list". However, information may be expressed using any data structures. That is, to indicate independence of information from the data structures, the "xxx table", the "xxx queue", or the "xxx list" may be referred to as "xxx information".

Furthermore, processes may hereinafter be described using a "program" as a subjective. However, the program is executed by a processor (for example, a CPU (Central Processing Unit)) to perform a specified process while appropriately using at least one of a storage resource (for example, a memory) and a communication interface device, and thus, the subjective for the process may be a processor or an apparatus having the processor. A part or all of the process executed by the processor may be performed by a hardware circuit. A computer program may be installed from a program source. A program source may be a program distribution server or a storage medium (or a portable storage medium, for example).

Furthermore, in the following description, an FM package is adopted as an example of a storage device. The FM package has an FM (Flash Memory). The FM includes a plurality of "physical blocks". Each of the physical blocks includes a plurality of "physical pages". The physical block or the physical page is an example of a physical area. Additionally, in the description below, data is accessed (read and write) in units of physical pages and erased in units of physical blocks. Additionally, in the description below, a sub logical space provided by the FM package may include a plurality of "logical blocks", and each of the logical blocks may include a plurality of "logical pages". The logical block or the logical page may be an example of a logical area. In addition, in the description below, the FM is of a write-once type. Specifically, when a logical area to which a physical page (hereinafter referred to as a page) is allocated is a write destination, an empty page is newly allocated to a write destination logical area instead of an allocated page, and data is written to the newly allocated page. For each logical area, data written to the newly allocated page is "valid data", and a page to which valid data is written is a "valid page". Data stored in a previously allocated page is "invalid data", and a page to which invalid data is written is an "invalid page". Furthermore, an "empty page" is a physical page that is neither a valid page nor an invalid page and in which data can newly be stored. Furthermore, as a physical storage medium provided in the storage device, a non-volatile semiconductor memory may be adopted instead of the FM (for example, a set of a plurality of FM chips): for example, a PRAM (Phase Change Random Access Memory), a MRAM (Magnetoresistive Random Access Memory), a ReRAM (Resistance Random Access Memory), or an FeRAM (Ferroelectric Random Access Memory).

Additionally, in the description below, when similar elements are described so as to be distinguished from one another, reference numerals are represented, for example, as "xxx 36*a*" and "xxx 36*b*". When similar elements are described with no distinction, a common number of a reference numeral may exclusively be used like "xxx 36".

In addition, in the description below, an external apparatus (an apparatus outside the storage controller) that transmits a defragmentation request is a file controller interposed between a storage system and a host system (hereinafter referred to as a "host") that transmits I/O (Input/Output) requests (write requests or read requests) to the storage system. However, the external apparatus may be the host or a management system coupled to the storage system at least to manage the storage system, instead of or in addition to the file controller. At least one of the host, the file controller, and the management system may be one or more computers.

Embodiment 1

FIG. 1 is a schematic diagram schematically illustrating Embodiment 1.

An FM package 80 is an example of a storage device and is an FM device including a plurality of FM chips. Write data for the FM package 80 (write target data) is written in a write-once manner rather than in an overwrite manner. The FM package 80 manages a physical space (FM, specifically, a plurality of FM chips) 38 including a plurality of physical pages in which data is stored. The FM package 80 manages a sub logical space 36 including a plurality of logical pages. The FM package 80 may have a logical physical map that allows management of logical pages in the sub logical space 36 and physical pages in the physical space 38. Typically, physical pages associated with logical pages are valid pages.

A storage controller 62 manages, as one logical space, a space (for example, a set of a plurality of sub logical spaces) based on a plurality of the sub logical spaces 36 provided by a plurality of the FM packages 80, and manages all or a part of one logical space as a logical VOL (logical volume) 22. The sub logical space has a plurality of logical pages, and therefore, the logical space has a plurality of logical pages. The logical VOL 22 may be partitioned into a plurality of VOL areas. One VOL area may be one logical page or a set of two or more logical pages (or one logical page may have two or more VOL areas). An I/O destination area (all or a part of one or more VOL areas) in the logical VOL 22 can be designated using a logical address (for example, an LBA (Logical Block Address)). An I/O destination area (all or a part of one or more logical pages) in the sub logical space 36 provided by the FM package 80 can also be designated using a logical address (for example, an LBA). The LBA designated for the storage system by the host (file controller) is an LBA for the logical VOL 22. The LBA designated for the FM package 80 by the storage controller 62 is an LBA for the sub logical space 36. The LBA for the logical VOL 22 may be the same as or different from the LBA for the sub logical space 36. In the latter case, the storage controller 62 may have information for management of the correspondence relation between the LBA for the logical VOL 22 and the LBA for the sub logical space 36.

In FIG. 1, data C is stored in an FM package 80b, and data D is stored in an FM package 80c. A logical page 28-2 belonging to the FM package 80b (a logical page 28-2 provided by the FM package 80b) is associated with a physical page in which the data C is stored. A logical page 30-2 belonging to the FM package 80c is associated with a physical page in which the data D is stored. On the other hand, in FIG. 1, data A and data B are stored in the same FM package 80a. A logical page 24-2 belonging to the FM package 80a is associated with a physical page in which the data A is stored. A logical page 26-2 is associated with a physical page in which the data B is stored.

Here, when the storage controller 62 executes a defragmentation process for the logical VOL 22, the following process is executed. The storage controller 62 makes a first determination of whether or not the LBA of the first data and the LBA of the second data belong to the same FM package for each set of data to be exchanged for each other (one of the data is referred to as "first data", and the other data is referred to as "second data"). Two cases described below will be described below in detail.

(Case A) Case A is a case where two data to be exchanged for each other are stored in different FM packages. Specifically, for example, in Case A, the data C positioned in an area designated by an LBA 28-1 corresponding to a logical page 28-2 is exchanged for the data D positioned in an area designated by an LBA 30-1 corresponding to a logical page 30-2. The "LBA corresponding to the logical page" as used herein may be an LBA for the sub logical space 36 or an LBA for the logical VOL 22. Therefore, the "area designated by the LBA corresponding to the logical page" may be all or a part of the logical page or all or a part of a VOL area corresponding to the logical page.

(Case B) Case B is a case where two data to be exchanged for each other are stored in the same FM package. Specifically, for example, in Case B, the data A positioned in an area designated by an LBA 24-1 corresponding to a logical page 24-2 is exchanged for the data B positioned in an area designated by an LBA 28-1 corresponding to a logical page 26-2.

Case A (A1) The storage controller 62 makes the first determination of whether or not the LBA 28-1 (logical page 28-2) and the LBA 30-1 (logical page 30-2) belong to the same FM package. Here, the result of the first determination is negative, specifically, indicates that the logical page 28-2 and the logical page 30-2 belong to different FM packages 80b and 80c. Therefore, the storage controller 62 executes an inter-device exchange process including (A2) to (A4) described below.

(A2) The storage controller 62 copies the data C from the FM package 80b to a buffer memory 58. Similarly, the storage controller 62 copies the data D from the FM package 80c to the buffer memory 58.

(A3) The storage controller 62 transmits, to the FM package 80c, a write request intended for the data C in the buffer memory 58 and designating an LBA in the data D. The FM package 80c stores the data C designated in the write request in an empty page in the FM package 80c, and allocates the physical page in which the data C is stored to the logical page 30-2 to which the LBA designated in the write request belongs, instead of the physical page in which the data D is stored. As a result, the physical page associated with the logical page 30-2 is changed from the physical page in which the data D is stored to the physical page in which the data C is stored. Thus, for the logical page 30-2, the data D is invalid data, and the data C is valid data.

(A4) Similarly, the storage controller 62 transmits, to the FM package 80b, a write request intended for the data D in the buffer memory 58 and designating the LBA of the data C. The FM package 80b stores the data D designated in the write request in an empty page in the FM package 80b, and allocates the physical page in which the data D is stored to the logical page 28-2 to which the LBA designated in the write request belongs, instead of the physical page in which the data C is stored. As a result, the physical page associated with the logical page 28-2 is changed from the physical page in which the data C is stored to the physical page in which the data D is stored. Thus, for the logical page 28-2, the data C is invalid data, and the data D is valid data.

Case B (B1) The storage controller 62 makes the first determination of whether or not the LBA 24-1 (logical page 24-2) and the LBA 26-1 (logical page 26-2) belong to the same FM package. Here, the result of the first determination is affirmative, specifically, indicates that the logical page 24-2 and the logical page 26-2 belong to the same FM package 80a. Therefore, the storage controller 62 executes an inter-device exchange process including (B2) to (B3) described below.

(B2) The storage controller 62 transmits, to the FM package 80a, an exchange instruction to exchange the physical page associated with the logical page 24-2 for the physical page associated with the logical page 26-2. Specifically, for example, the exchange instruction includes the LBA of the data A and the LBA of the data B. The LBAs are LBAs for the sub logical space 36a provided by the FM package 80a.

(B3) Upon receiving the exchange instruction, the FM package 80a changes the physical page associated with the logical page 24-2 to which the LBA of the data A belongs, from the physical page in which the data A is stored to the physical page in which the data B is stored (the physical page associated with the logical page 26-2 to which the LBA of the data B belongs). Similarly, the FM package 80a changes the physical page associated with the logical page 26-2 to which the LBA of the data B belongs, from the physical page in which the data B is stored to the physical page in which the data A is stored (the physical page associated with the logical page 24-2 to which the LBA of the data A belongs).

The above-described intra-device exchange process results in storage of the data B in the physical page corresponding to the logical page 24-2 after the exchange and storage of the data A in the physical page corresponding to the logical page 26-2 after the exchange. In other words, the intra-device exchange process involves no process of actually copying (migrating) the data A and the data B.

As described above, in the intra-device exchange process, when the first data (first logical page) and the second data (second logical page) belong to the same FM package 80, the data exchange (data rearrangement) can be completed without the need to copy the first and second data to the buffer memory 58 and the FM package 80. Consequently, a possible increase in communication load between the storage controller 62 and the FM package 80 can be suppressed.

Figure 2:
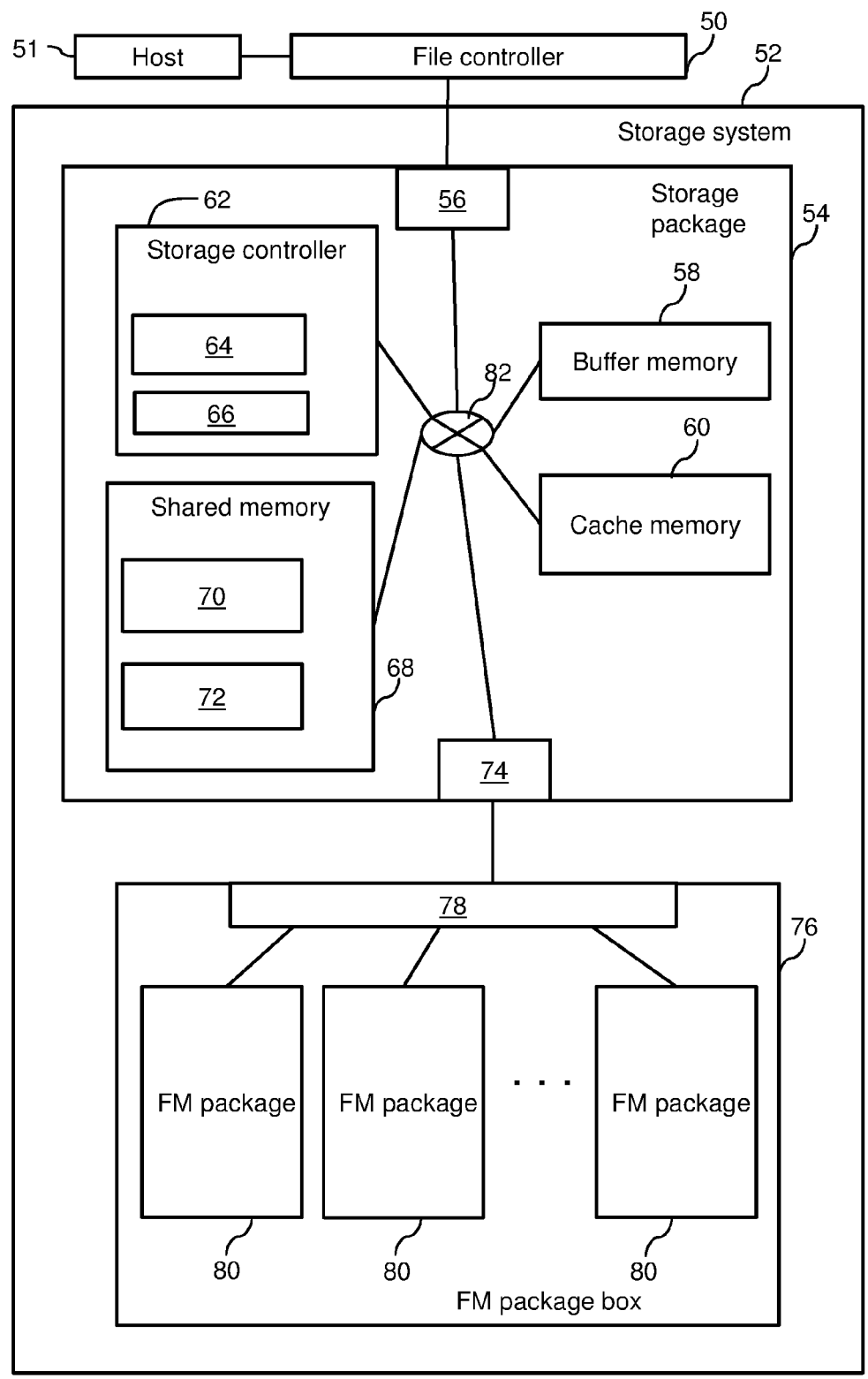
FIG. 2 is a schematic diagram illustrating a configuration example of a storage system according to Embodiment 1.

FIG. 2 is a schematic diagram illustrating a configuration example of a storage system according to Embodiment 1.

A storage system 52 includes a storage package 54 and an FM package box 76. The storage system 52 may include a plurality of FM package boxes 76.

The FM package box 76 has a switch 78 and a plurality of FM packages 80 coupled to the switch 78. The plurality of FM packages 80 in one FM package box 76 forms one or more parity groups. Two or more FM packages in two or more FM package boxes 76 may form one parity group.

The FM package 80 is a type of storage device having a plurality of FM chips 100. The FM package 80 will be described below in detail (see FIG. 3).

The switch 78 is an apparatus configured to couple the plurality of FM packages 80 to the storage package 54. The switch 78 controls data transfers among the plurality of FM packages 80 and between the storage packages 54.

The storage package 54 has the storage controller 62, a shared memory 68, the buffer memory 58, a cache memory 60, an FE (Front-End) I/F 56, and a BE (Back-End) I/F 74. These elements are coupled together via an internal bus 82 that enables bidirectional communication.

The storage controller 62 includes a processor 64 and a main memory 66. The main memory 66 stores programs, data, and the like. An example of the programs stored in the main memory 66 is a storage control program configured to control the storage system 52. The processor 64 executes the programs stored in the main memory 66 to implement various functions for storage. The storage controller 62 may have a plurality of sets of the processor 64 and the main memory 66 (that may also be referred to as a local memory). A plurality of the processors 64 may be able to reference the shared memory 68.

The FE I/F 56 is an I/F configured to couple the storage package 54 and a file controller 50 together. A command transmitted from the file controller 50 is transferred to the processor 64 in the storage controller 62 through the FE I/F 56. In accordance with the received command, the processor 64 in the storage controller 62 executes the storage control program stored in the main memory 66.

The shared memory 68 stores a PG (Parity Group) management table 70 and a logical VOL management table 72.

The PG management information 70 is information used to parity groups forming a RAID level. The logical VOL management table 72 is a table allowing logical VOLs to be managed.

The processor 64 in the storage controller 62 executes the storage control program and accesses the PG management information 70 and the logical VOL management table 72 as needed.

The PG management information 70 and the logical VOL management table 72 stored in the shared memory 68 may be provided to the file controller 50. This allows the file controller 50 to configure an argument for a defragmentation request.

Data input to or output from the FM package 80 is temporarily stored in at least one of the cache memory 60 and the buffer memory 58. A difference between the cache memory 60 and the buffer memory 58 is whether or not read data remains in the memory. Specifically, data read from the cache memory 60 remains in the cache memory 60. On the other hand, data temporarily read from the buffer memory 58 does not remain in the buffer memory 58.

The BE I/E 74 is coupled to the switch 78 in the FM package box 76. A command issued from the processor 64 in the storage controller 62 is transferred to the FM package 80 through the BE I/F 74 and the switch 78. The transferred data including the command may be provided with redundant data (for example, an ECC (Error Correcting Code)).

In the description below, when the processor 64 in the storage controller 62 is a subject, the storage controller 62 may be expressed as a subject.

A host 51 is coupled to the file controller 50. The file controller 50 is coupled to the storage system 52. The file controller 50 is, for example, what is called a NAS (Network Attached Storage) head and forms a file system space allowing data in the storage system 52 (block data) to be managed as file data. The file controller 50 provides the file system space to the host 51.

The host 51 transmits a read request or a write request for file data in the file system space to the file controller 50. Upon receiving the read request or the write request, the file controller 50 transmits, to the storage system 52, a read request or a write request for block data forming the file data in the received read request or write request. The read request or write request in the block data may designate the LBA for a logical VOL.

The file controller 50 transmits a plurality of (or one) defragmentation requests to the storage system 52. A defragmentation process for a logical VOL is a process including a plurality of exchange processes responding to the respective defragmentation requests. As a result of a defragmentation process for a logical VOL, a plurality of data (block data) forming the same file (file data) is contiguously arranged in the logical VOL.

Therefore, in the present embodiment, the defragmentation request is a request for a migration process for exchanging storage positions of first and second data to be exchanged for each other or migrating first data in a first FM package to a second FM package (in which second data is stored). The defragmentation request may have an argument for configuring exchange of first data stored in a first area for second data stored in a second area. Alternatively, the defragmentation request may have an argument for configuring migration of the first data stored in the first area to an empty area.

Specifically, for example, the defragmentation request is defined by "LBA_MOVE (defragmentation ID, SRC_LBA0, DST_LBA0, SRC_LBA1, DST_LBA1)".

A defragmentation ID is information used to identify the issued defragmentation request. SRC_LBA0 and SRC_LBA1 are LBAs (for example, LBAs for logical VOLs) indicative of logical pages corresponding to migration sources. DST_LBA0 and DST_LBA1 are LBAs (for example, LBAs for logical VOLs) indicative of logical pages corresponding to migration destinations.

LBA_MOVE for which an argument is configured for SRC_LBA0 and DST_LAB0 and no argument is configured for SRC_LBA1 and DST_LBA1 is defined as a defragmentation request for data migration in an area indicated by SRC_LBA0 to an area indicated by DST_LBA0. The defragmentation request is hereinafter referred to as the "defragmentation request for migration".

LBA_MOVE for which an argument is configured for SRC_LBA0 and DST_LAB0 and an argument is also configured for SRC_LBA1 and DST_LBA1 is defined as a defragmentation request for exchange of data related to a logical page indicated by SRC_LBA0 with data related to a logical page indicated by DST_LBA0. In this case, LBA of DST_LAB0 is defined to be configured for SRC_LBA1, and LBA of SRC_LAB0 is defined to be configured for DST_LBA1. This defragmentation request is hereinafter referred to as the "defragmentation request for exchange".

The file controller 50 may generate a defragmentation request list in which a plurality of defragmentation requests are listed and transmit the defragmentation request list to the storage system 52. In this case, the storage controller 62 may execute the plurality of defragmentation requests included in the defragmentation request list in order.

The defragmentation request list may meet the following constraint. That is, the defragmentation request list precludes the mixture of a defragmentation request for a process in the same FM package 80 and a defragmentation request for a process between different FM packages 80. However, the defragmentation request list for a case where stripe bit is on as illustrated in Embodiment 2 described below may allow for the mixture of a defragmentation request for a process in the same FM package 80 and a defragmentation request for a process between different FM packages 80. Furthermore, the defragmentation request list may be precluded from including a defragmentation request for a process between different FM packages 80 which request is intended for different storage system 52.

The file controller 50 references the PG management information 70 and the logical VOL management table 72 to generate a defragmentation request list so as to meet the above-described constraint.

Figure 3:
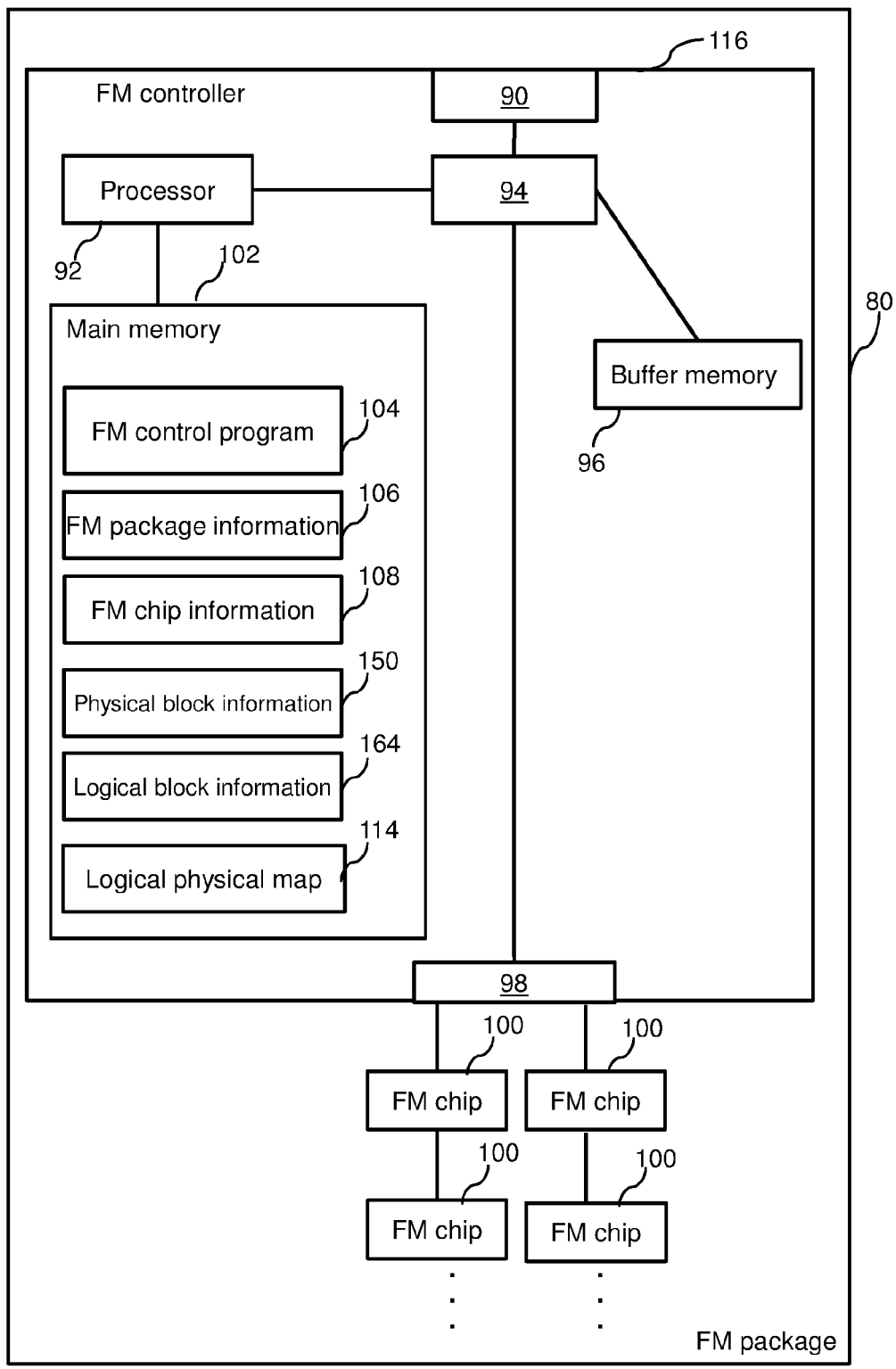
FIG. 3 is a schematic diagram illustrating a configuration example of an FM package according to Embodiment 1.

FIG. 3 is a schematic diagram illustrating a configuration example of the FM package 80 according to Embodiment 1.

The FM package 80 includes a plurality of FM chips 100 and an FM controller 116 that controls the FM chips 100. Each of the FM chips 100 has a plurality of physical blocks. Each of the physical blocks has a plurality of physical pages.

The FM controller 116 has a processor 92, a main memory 102, a buffer memory 96, an FE I/F 90, a BE I/F 98, and a data transfer control unit 94 that controls data transfer between the above-described elements.

The FE I/F 90 is coupled to the switch 78 in the FM package box 76. A command transmitted from the storage controller 62 is received by the FM controller 116 through the FE I/F 90.

The BE I/F 98 is an I/F configured to couple the FM controller 116 and the FM chips 100 together.

The main memory 102 stores programs, data, and the like. Examples of the programs and the data stored in the main memory 102 include an FM control program 104, FM package information 106, FM chip information 108, physical block information 150, physical block information 164, and logical physical map 114.

The FM control program 104 is a program allowing the FM package 80 to be controlled. The processor 92 executes the programs stored in the main memory 102 to implement functions related to the FM package 80.

The FM package information 106 has information (configuration and configured values) on the FM package 80. The FM chip information 108 has information (configuration, configured values and the like) on the configuration and the like of the FM chips 100.

The physical block information 150 has information on physical blocks managed by the FM controller 116. The physical block information 150 will be described below in detail (see FIG. 6).

The logical block information 164 has information on logical blocks managed by the FM controller 116. The logical block information 164 will be described below in detail (see FIG. 6).

The logical physical map 114 is information that allows management of correspondence relations between LBAs (LBAs for the sub logical spaces) and PBAs (Physical Block Addresses) (an example of physical addresses). The logical physical map 114 will be described in detail (see FIG. 6).

Write data transmitted from the storage package 54 passes through the FE I/F 90 and the data transfer control unit 94 and is temporarily stored in the buffer memory 96. The processor 92 sends the write data through the BE I/F 98 and stores the write data in the FM chips 100. In the description below, when the processor 92 in the FM controller 116 is a subject, the FM controller 116 may be expressed as a subject.

FIG. 4 is a diagram illustrating a data configuration example of the PG management information 70 according to Embodiment 1.

The PG management information 70 is stored in the shared memory 68 in the storage package 54 and has information allowing the parity groups to be managed. One piece of the PG management information 70 may have information on one parity group in the storage system 52. The PG management information 70 may include a drive management table 122 and a stripe group management table 132.

The drive management table 122 is a table allowing management of drives (FM packages 80) forming a parity group. The drive management table 122 may have, field values, a logical VOL ID 124, a RAID configuration 126, a drive ID 128, and a physical start address 130.

The logical VOL ID 124 is information allowing identification of each logical VOL generated based on the parity group.

The RAID configuration 126 is information indicative of a RAID level and a PG configuration (for example, the number of data and the number of parities per stripe group) of the parity group, which is the basics of the logical VOL in the logical VOL ID 124.

The drive ID 128 is information allowing each drive (FM package 80) to be identified. When a plurality of drive IDs are associated with the logical VOL ID 124, this indicates that the logical VOL includes the plurality of drives (FM packages 80).

The physical start address 130 is information indicative of an LBA (LBA for sub logical space) corresponding to the first one of the logical VOLs with the logical VOL IDs 124 in the sub logical space for the drives with the drive IDs 128.

The stripe group management table 132 is a table allowing the stripe groups in the parity group to be managed. The stripe group is a group of a plurality of storage areas (strips) corresponding to the respective drives forming the parity group, and may be a unit of parity generation. The parity may be XOR (exclusive OR) of a plurality of data belonging to the stripe group. The stripe may be a set of one or more logical pages.

The stripe group management table 132 may have a logical VOL ID 134, a stripe group ID 136, and a parity storage drive ID 138 as field values.

The logical VOL ID 134 is as described above. The stripe group ID 136 is information used to identify each stripe group.

The parity storage drive ID 138 is the ID of a drive in which parities belonging to the stripe group with the stripe group ID 136 are stored. A plurality of field values may be related to the parity storage drive ID 138. For example, when the logical VOL with the logical VOL ID 134 is configured in RAID5, one field value for P parities may be related to the parity storage drive ID 138. For example, when the logical VOL with the logical VOL ID 134 is configured in RAID6, two field values for P parities and Q parities may be related to the parity storage drive ID 138.

In the present embodiment, a case will be described where the RAID configuration 126 is "RAID5 (3D+1P)" as depicted in FIG. 4. However, the RAID configuration 126 is not limited to this. For example, the RAID configuration 126 may be another RAID configuration such as RAID4 (for example, 3D+1P) or RAID6 (for example, 6D+2P).

FIG. 5 is a diagram illustrating a data configuration example of the logical VOL management table 72 according to Embodiment 1.

The logical VOL management table 72 has information on the logical VOLs stored in the shared memory 68 in the storage package 54 and managed by the storage system 52.

The logical VOL management table 72 has, as field values, a logical VOL ID 140, a logical start address 142, and a PG ID 144.

The logical VOL ID 140 is as described above. The logical start address 142 is information indicative of an LBA (an LBA for a logical VOL) corresponding to the leading one of the logical VOLs with the logical VOL IDs 140 in the sub logical space based on the parity group with the PG ID 144. The PG ID 144 is information used to identify each parity group based on the logical VOL with the logical VOL ID 140.

Figure 6:
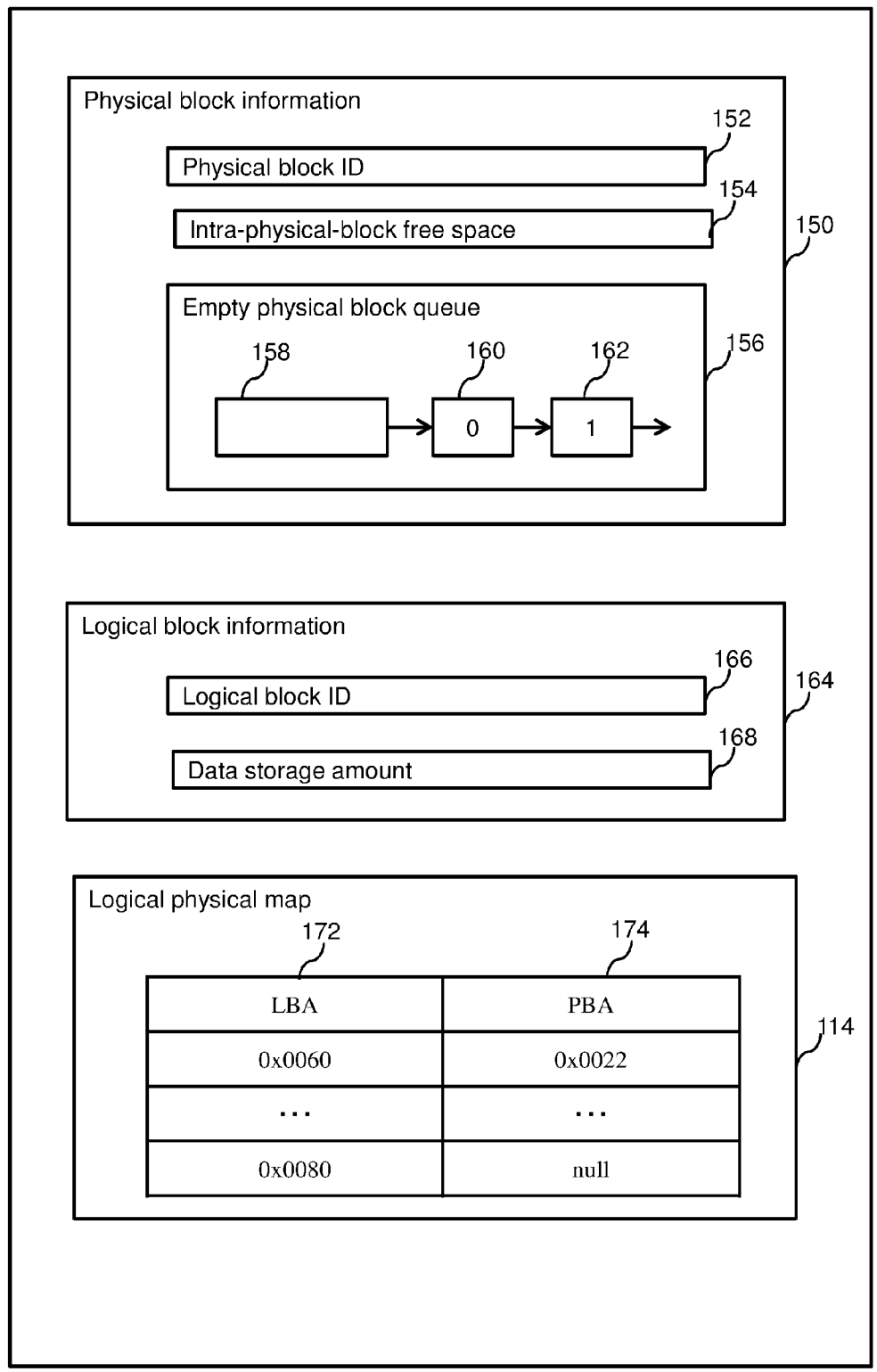
FIG. 6 is a diagram illustrating a data configuration example of physical block information, logical block information, and a logical physical map according to Embodiment 1.

FIG. 6 is a diagram illustrating a data configuration example of the physical block information 150, the logical block information 164, and the logical physical map 114 according to Embodiment 1.

The physical block information 150 is information stored in the main memory 102 in the FM package 80 to manage physical blocks provided in the FM package 80. The physical block information 150 includes a physical block ID 152, an intra-physical-block free space 154, and an empty physical block queue 156.

The physical block ID 152 includes a plurality of physical block IDs corresponding to the respective physical blocks (information used to identify each physical block). A start PBA may be associated with each of a plurality of physical blocks.

The physical block free space 154 is information indicative of the amount of free space in the physical page (the total amount of empty page) in each of a plurality of physical blocks.

The empty physical block queue 156 is a queue of physical block IDs of empty physical blocks in the FM package 80. For example, the empty physical block queue 156 indicates that the empty physical block queue starts with an empty physical block pointer 158 and has a physical block ID 160 "0" and a physical block ID 162 "1" enqueued.

The logical block information 164 is information stored in the main memory 102 in the FM package 80 to manage logical blocks provided in the FM package 80. The logical block information 164 includes a logical block ID 166 and a data storage amount 168.

The logical block ID 166 includes a plurality of logical block IDs corresponding to the respective logical blocks (information used to identify each logical block). A start LBA may be associated with each of a plurality of physical blocks.

A physical block (logical page) and a physical block (physical page) may have the same size or different sizes.

The number of logical blocks (logical pages) provided in the FM package 80 may be equal to or larger than the number of physical blocks (physical pages). In contrast, the number of physical blocks (physical pages) provided in the FM package 80 may be equal to or larger than the number of logical blocks (logical pages).

The data storage amount 168 is information indicative of the total amount of stored data (for example, the total amount of valid data) (or the amount of free space) for each of the plurality of logical blocks.

The logical physical map 114 is information on correspondence relations between LBAs (LBAs for the sub logical spaces) 172 and PBAs 174. The correspondence relations between the LBAs and the PBAs are managed, for example, in units of pages.

For example, when the storage controller 62 transmits to the FM package 80 a write instruction designating the LBA belonging to the logical page indicated by an LBA 172 "0x0060", the FM controller 116 executes the following process. That is, the FM controller 116 writes data designated in the write instruction to an empty page and associates a PBA 174 "0x0022" in the empty page with the LBA 172 "0x0060" to which the designated LBA belongs in the logical physical map 114.

Furthermore, for example, when the storage controller 62 transmits, to the FM package 80, a read instruction designating the LBA belonging to the logical page indicated by the LBA 172 "0x0060", the FM controller 116 executes the following process. That is, the FM controller 116 identifies, in the logical physical map 114, the physical page with the PBA 174 "0x0022" corresponding to the LBA 172 "0x0060" to which the designated LBA belongs. The FM controller 116 reads data from the identified physical page and transmits a part of the data that corresponds to the designated LBA, to the storage controller 62.

When no PBA 174 is associated with the LBA 172, in the logical physical map 114, the PBA 174 corresponding to the LBA 172 may be "NULL". Correspondence relations between LBAs and PBAs may be managed in units each larger or smaller than the page unit.

Figure 7:
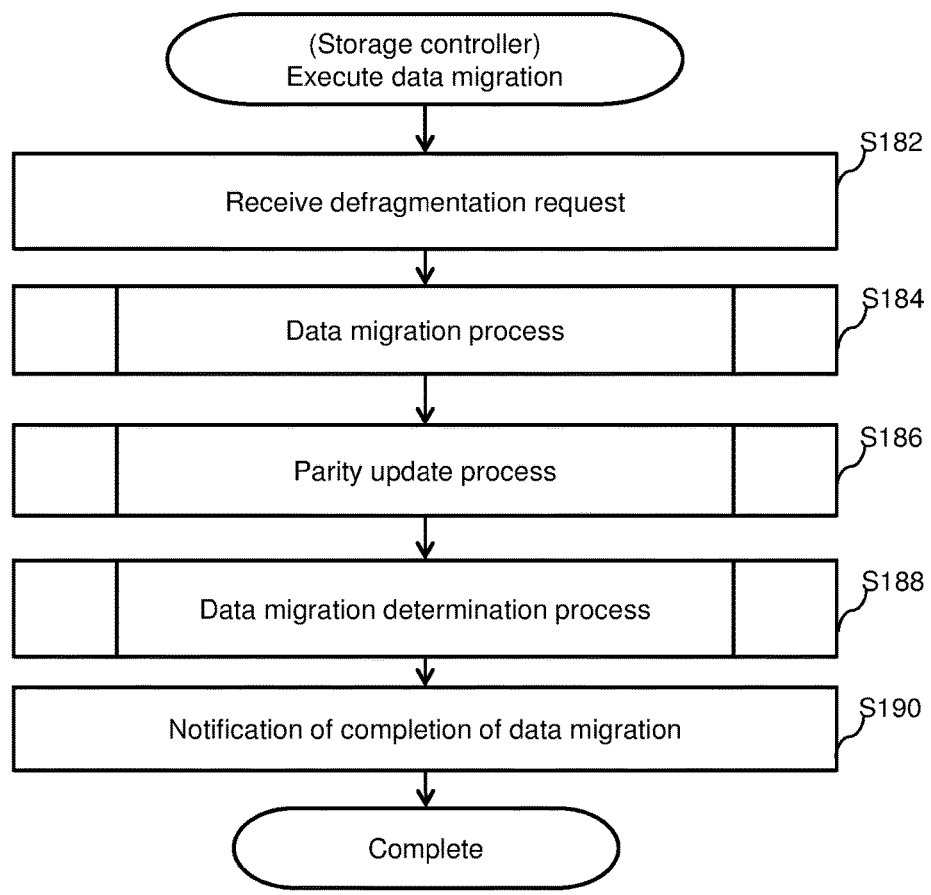
FIG. 7 is a flowchart illustrating an example of a defragmentation process according to Embodiment 1.

FIG. 7 is a flowchart illustrating an example of the defragmentation process according to Embodiment 1.

Upon receiving the defragmentation request from the file controller 50, the storage controller 62 analyzes the defragmentation request (S182). For example, the storage controller 62 determines whether the defragmentation request is a defragmentation request for migration or a defragmentation request for exchange. Furthermore, the storage controller 62 extracts a defragmentation ID, a source LBA, and a destination LBA from the defragmentation request. Upon receiving the defragmentation request list from the file controller 50, the storage controller 62 may subsequently sequentially process a plurality of defragmentation requests included in the defragmentation request list or simultaneously process the defragmentation requests in parallel.

Then, the storage controller 62 executes a data migration process based on analysis results for the defragmentation requests (S184). In the data migration process, migration, exchange of data, or the like is executed based on the defragmentation request. The data migration process may be executed asynchronously with the process in S182. The data migration process will be described below in detail (see FIG. 8A).

Now, the storage controller 62 instructs the FM controller 116 in the FM package 80 in which data migration has resulted from the data migration process to execute a parity update process (S186). This is because a change in data belonging to the parity group as a result of data migration may change the parities belonging to the parity group. The parity update process will be described below in detail (see FIG. 8B).

Then, the storage controller 62 instructs the FM controller 116 in the FM package 80 in which data migration has resulted from the data migration process to execute a data migration determination process (S188). The instruction to determine data migration may include an update instruction for the physical block information 150, the logical block information 164, the logical physical map 114, and the like. The data migration determination process will be described in detail (see FIG. 8C).

Finally, the storage controller 62 notifies the file controller 50 of completion of the defragmentation request process (S190) to complete the present process.

When the process of receiving the defragmentation request (S182) and the subsequent processing (S184 to S190) is asynchronously executed, the file controller 50 may periodically inquire of the storage controller 62 as to whether or not the defragmentation request process has been completed, to check for completion of the defragmentation request process. Processing similar to the processing in S184 to S188 maybe executed on the storage controller 62 side. In that case, the storage controller 62 may store the data in the cache memory 60 and execute a data migration process (S184) on the cache memory 60. Alternatively, the storage controller 62 may store the data in the buffer memory 58, transfer the data in the buffer memory 58 to an area in the cache memory 60 that corresponds to the data destination, and execute the data migration process on the cache memory 60. In this case, the parity update process (S186) may also be executed by the storage controller 62.

Figure 8A:
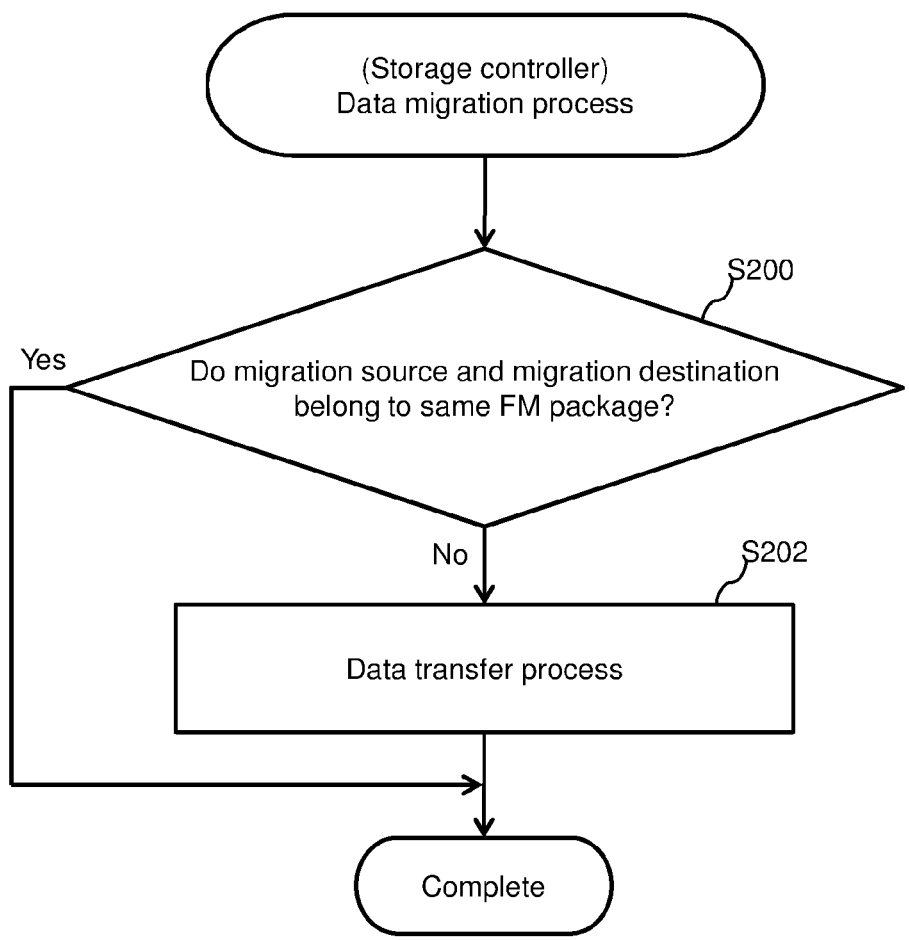
FIG. 8A is a flowchart illustrating an example of a data migration process according to Embodiment 1.

FIG. 8A is a flowchart illustrating an example of the data migration process according to Embodiment 1. The present process is the details of the process in S184 in FIG. 7.

The storage controller 62 determines whether or not a migration source LBA and a migration destination LBA configured in the defragmentation request belong to the same FM package 80 (first determination) (S200).

The storage controller 62 may make the first determination as follows.

(C1) The storage controller 62 acquires, from the logical VOL management table 72, the logical VOL ID 140 and the PG ID 144 to which the migration source LBA (or the migration destination LBA) belongs. In the present embodiment, the migration source LBA and the migration destination LBA belong to the same parity group, and thus, the PG ID 144 may be acquired using one of the migration source LBA and the migration destination LBA as a key.

(C2) The storage controller 62 identifies the PG management information 70 corresponding to the PG ID 144 acquired in (C1).

(C3) The storage controller 62 acquires the drive ID 128 and the physical start address 130 corresponding to the logical VOL ID 124 to which the migration source LBA belongs, from the drive management table 122 in the PG management information 70 identified in (C2). Based on the migration source LBA, the drive ID 128 acquired, and the physical start address 130, the storage controller 62 identifies the drive ID 128 to which the migration source LBA belongs. Similarly, the storage controller 62 acquires the drive ID 128 and the physical start address 130 related to the migration source LBA, from the drive management table 122 for the storage controller 62. Based on the migration destination LBA, the drive ID 128 acquired, and the physical start address 130, the storage controller 62 identifies the drive ID 128 to which the migration destination LBA belongs.

(C4) The storage controller 62 compares the drive ID 128 to which the migration source LBA belongs with the drive ID 128 to which the migration destination LBA belongs to determine whether or not these drive IDs 128 are the same.

When the defragmentation request is a "defragmentation request for exchange", the storage controller 62 may determine that the migration source LBA and the migration destination LBA belong to the same FM package 80. Upon receiving the defragmentation request list, the storage controller 62 may make the above-described determination for each of the defragmentation requests included in the defragmentation request list. Alternatively, when the defragmentation request meets the above-described constraint, the storage controller 62 may make the above-described determination exclusively for the leading defragmentation request and apply the same determination result to the subsequent defragmentation requests. This is because the defragmentation request list meets the above-described constraint, avoiding the mixture of a defragmentation request for a process in the same FM package 80 and a defragmentation request for a process between different FM packages 80.

When the determination result in S200 is affirmative, that is, indicates that the migration source LBA and the migration destination LBA belong to the same FM package 80 (S200: YES), the storage controller 62 completes the present process.

When the determination result in S200 is negative, that is, indicates that the migration source LBA and the migration destination LBA belong to different FM packages 80 (S200: NO), the storage controller 62 migrates the data between the different FM packages 80 (S202) to complete the present process.

The storage controller 62 migrates the data between the different FM packages 80 as follows.

(D1) The storage controller 62 reads the data positioned in the area indicated by the migration source LBA from the migration source FM package 80 (the FM package 80 identified from the drive ID to which the migration source LBA belongs), and stores the read data in the buffer memory 58.

(D1) The storage controller 62 writes the data stored in the buffer memory 58 to the migration destination FM package 80 (the FM package 80 identified from the drive ID to which the migration destination LBA belongs).

Alternatively, the storage controller 62 migrates the data between the different FM packages 80 as follows.

(E1) The storage controller 62 reserves a data storage area in the buffer memory 58.

(E2) The storage controller 62 instructs the migration source FM package 80 to store the data positioned in the area indicated by the migration source LBA in the buffer memory 58, and instructs the migration destination FM package 80 to acquire the data stored in the buffer memory 58.

Alternatively, upon receiving the defragmentation request list, the storage controller 62 may migrate the data between the different FM packages 80 as follows.

(F1) The storage controller 62 forms a plurality of defragmentation requests included in the defragmentation request list into a group for each migration destination FM package 80. Consequently, one or more groups are formed, and one request group is a set of one or more defragmentation requests for which the migration destination LBA belongs to the same FM package.

(F2) The storage controller 62 acquires the data positioned in the area indicated by the migration source LBA from each of the plurality of migration source FM packages 80 belonging to the group of the FM packages 80 with the same migration destination FM package 80, and stores the acquired data in the buffer memory 58.

(F3) The storage controller 62 stores the plurality of data stored in the buffer memory 58, in the FM packages 80 with the same migration destination (at a time) using one single command.

Figure 8B:
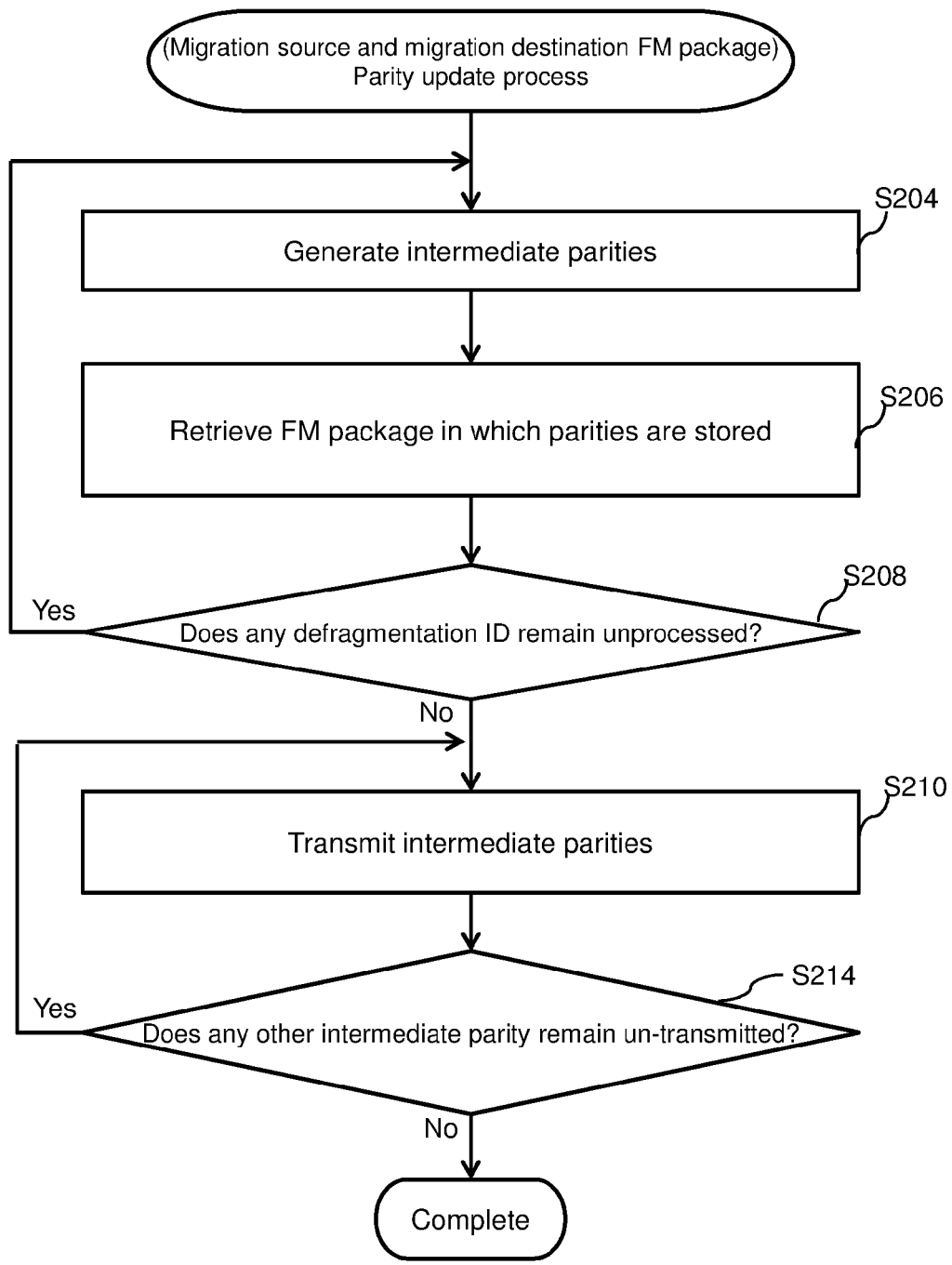
FIG. 8B is a flowchart illustrating an example of a parity update process according to Embodiment 1.

FIG. 8B is a flowchart illustrating an example of a new-parity creation instruction according to Embodiment 1. The present process is the details of the process in S186 in FIG. 7.

The present process is executed by the FM controller 116 in the data migration source or destination FM package 80 indicated by the storage controller 62. When the defragmentation request is a defragmentation request for exchange, the data migration destination FM package 80 is the same as the data migration source FM package 80.

The FM controller 116 generates intermediate parities for each defragmentation ID based on un-updated data and updated data (S204). The un-updated data is data originally present in the data migration source FM package 80. The updated data is data that replaces the un-updated data. The intermediate parity may be XOR between the un-updated data and the updated data.

For example, when the defragmentation request is a request for exchange between data A and data B, the relation between the data A and the data B is such that the data B is the updated data as viewed from the data A, whereas the data A is the updated data as viewed from the data B. Therefore, in this case, intermediate parities may be generated based on data A and Data B to be exchanged for each other, and the intermediate parities may be used to update parities for the stripe groups to which the data A and the data B belong. This is because, in this case, even when intermediate parities are generated for each of the two stripe groups, the same intermediate parities are eventually generated.

Then, the FM controller 116 performs retrieval to determine in which FM package 80 the parities of the stripe group to which the updated data belongs are stored (S206).

The FM controller 116 performs the retrieval as follows.

(G1) As is the case with S200, the FM controller 116 acquires, from the logical VOL management table 72, the logical VOL ID 140 to which the LBA related to the updated data belongs, the logical start address 142, and the PG ID 144.

(G2) The FM controller 116 acquires a plurality of stripe group IDs 136 associated with the logical VOL ID 134 acquired in (G1), from the stripe group management table 132 in the PG management information 70 corresponding to the PG ID 144 acquired in (G1).

(G3) The FM controller 116 calculates the LBA related to the updated data from the logical start address 142 acquired in (G1), and identifies the stripe group ID 136 to which LBA relating to the updated data belongs, in the plurality of stripe group IDs 136 acquired in (G2).

(G4) The FM controller 116 identifies the parity storage drive ID 138 corresponding to the stripe group ID 136 identified in (G3). For RAID6, the FM controller 116 also identifies a Q parity storage drive ID.

Then, the FM controller 116 determines whether or not any defragmentation ID remains unprocessed (S208).

If any defragmentation ID remains unprocessed (S208: YES), the FM controller 116 executes the processing in S204 to S208 for the remaining defragmentation ID.

If no defragmentation ID remains unprocessed (S208: NO), the FM controller 116 proceeds to the next process in S210.

Then, the FM controller 116 transmits the intermediate parities generated in the process in S204 to the FM package 80 indicated by the parity storage drive ID 138 identified in the process in S206 (S210).

The transmission process for the intermediate parities may be executed as follows.

(H1) The FM controller 116 instructs the storage controller 62 to reserve an area in the buffer memory 58 where the intermediate parities are to be stored. The FM controller 116 receives, from the storage controller 62, a notification that the area is reserved in the buffer memory 58, and then executes the following process.

(H2) The FM controller 116 stores in the reserved area in the buffer memory 58 all (typically, a plurality of intermediate parities) of those of a plurality of intermediate parities which are to be transferred to the same FM package 80 having un-updated parities.

(H3) The plurality of intermediate parities stored in the reserved area in the buffer memory 58 is transferred to the same FM package 80 using one command.

Here, the FM controller 116 may apply one guarantee code (for example, ECC (Error Correcting Code)) to the plurality of intermediate parities (united intermediate parities) or apply a guarantee code to each of the intermediate parities.

Alternatively, the transmission process for the intermediate parities may be executed as follows. That is, the storage controller 62 stores the plurality of intermediate parities generated by the FM controller 116 in the reversed area in the buffer memory 58 and transmits all of those of the plurality of intermediate parities which are to be transferred to the same FM package 80 having the un-updated parities, to the same FM package 80 at a time using one command.

Consequently, when the plurality of intermediate parities to be transmitted to the same FM package 80 is transmitted (at a time) using one command, the number of command issuances can be reduced. Therefore, a processing load on the storage controller 62 and the FM controller 116 can be reduced. Furthermore, when the parity group is in RAID4, any of the FM packages 80 stores only the parities. In this case, all the retrievals in the process in S206 result in the same FM package, and thus, the processing in S210 to S214 is completed in one loop. That is, the number of command issuances needed to transmit the intermediate parities can be reduced.

Here, after receiving the intermediate parities, the FM controller 116 to which the intermediate parities are to be transmitted (in other words, which has the un-updated parities) may transmit, to the storage controller 62, a notification that transmission of the intermediate parities has been completed. The FM controller 116 may generate updated parities based on the un-updated parities and the intermediate parities. The process for generating updated parities may be executed after reception of an instruction from the storage controller 62. Upon completing generation of updated parities, the FM controller 116 may transmit, to the storage controller 62, a notification that generation of updated parities has been completed.

Then, upon transmitting the intermediate parities, the FM controller 116 determines whether or not any intermediate parity remains un-transmitted (S214).

If any intermediate parity remains un-transmitted (S214: YES), the FM controller 116 executes the processing in S210 to S214 for the remaining intermediate parity.

If no intermediate parity remains un-transmitted (S214: NO), the FM controller 116 completes the present process.

Figure 8C:
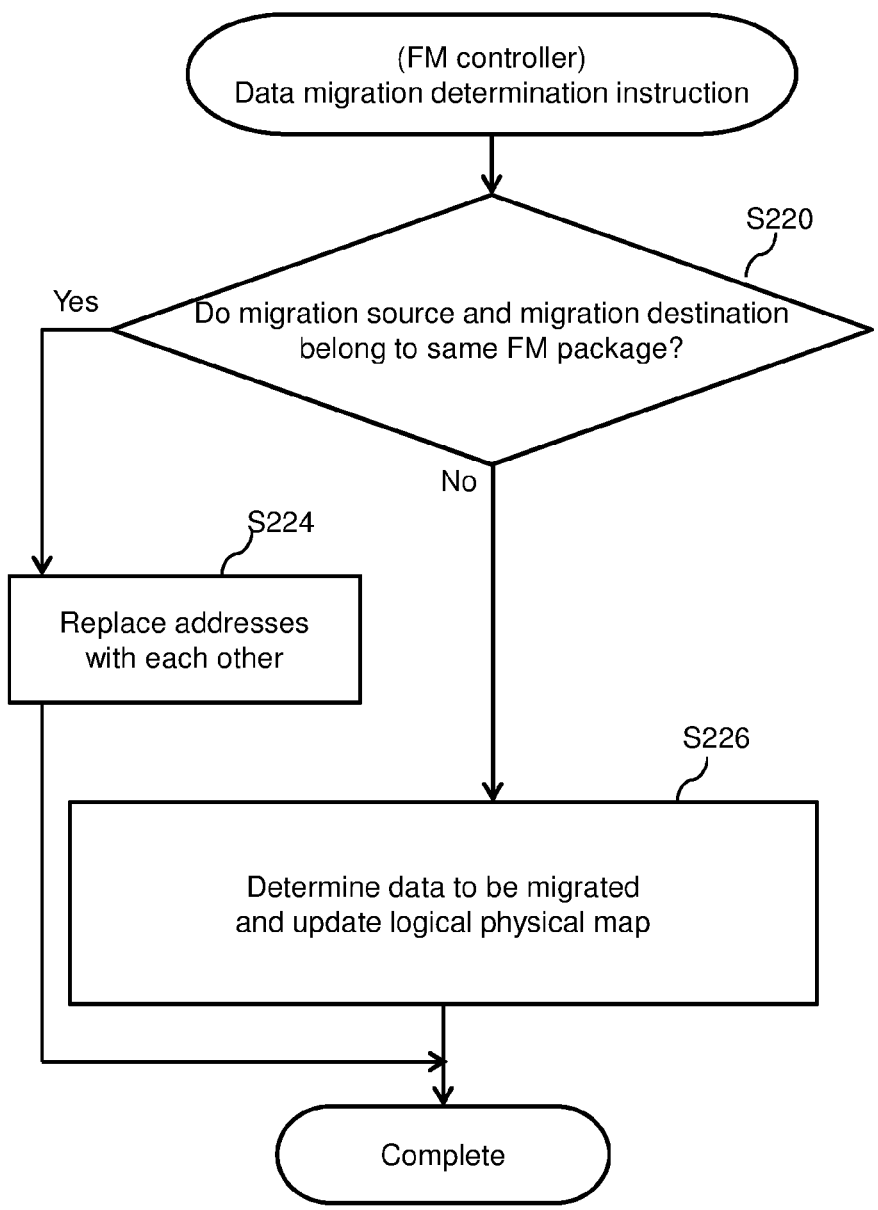
FIG. 8C is a flowchart illustrating an example of a data migration determination process according to Embodiment 1.

FIG. 8C is a flowchart illustrating an example of a data migration determination process according to Embodiment 1. The present process is the details of the process in S188 in FIG. 7.

The present process is executed by the FM controller 116 in each of the data migration source and destination FM packages 80. The FM package 80 may execute the present process upon receiving an instruction from the storage controller 62.

The FM controller 116 determines whether or not the migration source and the migration destination of the target data for the present process are the same FM package 80 (S220). The result of the determination matches the result of the determination in S200 in FIG. 8A.

If the migration source and the migration destination of the target data are the same FM package 80 (in other words, the case of a defragmentation request for exchange) (S220: YES), the FM controller 116 executes an address exchange process for each defragmentation ID (S224). The address exchange process may be a process of exchanging the PBA 174 corresponding to the migration source LBA 172 for the PBA 174 corresponding to the migration destination LBA 172 in the logical physical map 114. Consequently, the data exchange in the defragmentation process can be achieved without the need to copy the data indicated by the PBA 174.

Upon completing the address exchange process for all the defragmentation IDs, the FM controller 116 transmits, to the storage controller 62, a notification that the address exchange process has been completed, to complete the present process.

If the migration source and the migration destination of the target data are different FM packages 80 (in other words, the case of a defragmentation request for migration) (S220: NO), the FM controller 116 executes the following data exchange for each defragmentation ID.

(J1) The migration destination FM controller 116 reserves an empty physical page in the FM chip 100 where the data from the migration source is to be stored. The migration destination FM controller 116 may receive and store the data from the migration source immediately after the physical page is reserved or may temporarily end the process upon reserving the physical page, receive the data asynchronously with the reservation of the physical page, and store the data in the reserved physical page.

(J2) The migration destination FM controller 116 identifies from the logical physical map 114 the PBA 174 associated with the LBA 172 to which the LBA at which the data from the migration source is stored belongs.

(J3) The migration destination FM controller 116 exchanges the PBA 174 identified in (J2) for the PBA of the physical page reserved in (J1).

(J4) The processing in (J1) to (J3) is similarly executed in the FM package 80 in which the migration source and the migration destination have been replaced with each other. For example, in the description of (J1) to (J3), if the migration destination FM package is an FM package 80c and the migration source FM package is an FM package 80b, then in (J4), the migration destination FM package is the FM package 80b and the migration source FM package is the FM package 80c.

Each of the FM controllers 116 in the different FM packages 80 transmits a notification indicative of completion of the data exchange process to the storage controller 62 to end the present process.

According to Embodiment 1, at least one of the following effects can be obtained.

(1) Only the minimum data copying needs to be performed, allowing suppression of the amount of data copying during the defragmentation process.

(2) When the migration destination data and the migration source data are present in the same FM package, the data transfer between the FM packages can be suppressed. This enables a reduction in a data transfer load on a communication path coupling the storage package and the FM packages together.

Embodiment 2

Embodiment 2 will be described. In this case, differences from Embodiment 1 will mainly be described, and description of points common to Embodiment 1 is omitted or simplified.

A method for generating updated parities involves calculating the XOR between un-updated data and updated data to generate intermediate parities and calculating the XOR between the intermediate parities and the un-updated parities to updated parities. This method is hereinafter referred to as a "first updated parity generation method". In Embodiment 1, updated parities are generated by the first updated parity generation method.

Another method for generating updated parities is to generate updated parities by calculating the XOR between updated data belonging to the stripe group and each of the other data (other than the un-updated parities). This method is hereinafter referred to as a "second updated parity generation method".

When one stripe group includes a large amount of updated data striding over a plurality of drives, the first updated parity generation method needs a large number of processes to generate updated parities. In such a case, the second updated parity generation method allows updated parities to be generated during one process.

Therefore, also for a defragmentation process, when one stripe group includes a large amount of exchange target data, the use of the second updated parity generation method enables a reduction in the number of processes executed compared to the use of the first updated parity generation method.

Figure 9:
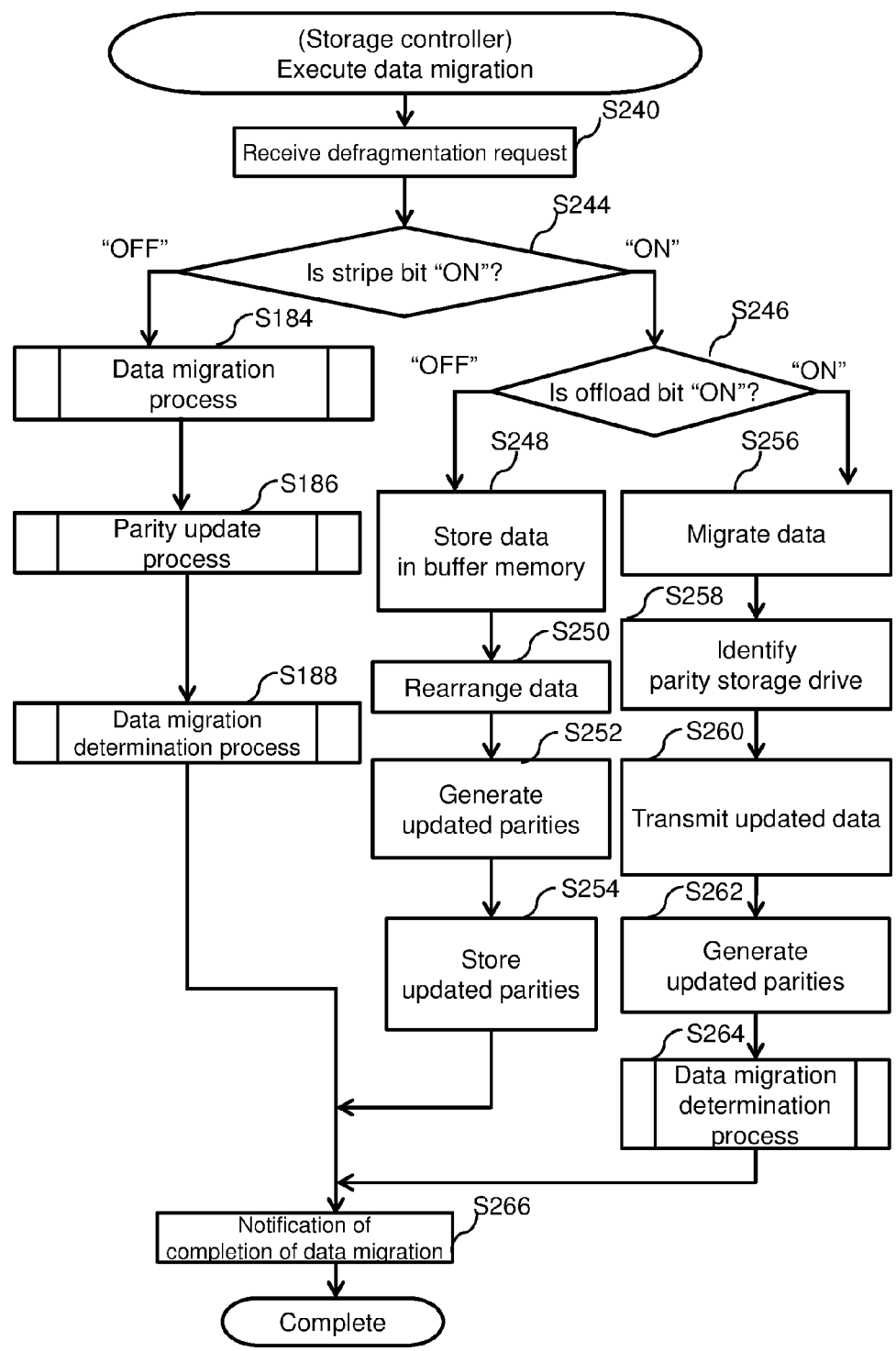
FIG. 9 is a flowchart illustrating an example of a defragmentation process in units of a stripe group according to Embodiment 2.

FIG. 9 is a flowchart illustrating an example of a defragmentation process in units of stripe groups according to Embodiment 2.

Upon receiving a defragmentation request generated by the file controller 50, the storage controller 62 analyzes the defragmentation request (S240). This process maybe similar to the processing in S182 in FIG. 7. Stripe bits may be configured in the defragmentation request. The stripe bits may be configured for each stripe group.

The stripe bit turned "ON" indicates that exchange target data in the defragmentation requests included in the defragmentation request list all belong to the same stripe group and that a large amount of exchange target data is present in the same stripe group and is distributively stored in the plurality of FM packages 80. For example, when the number of exchange target data is equal to or larger than a predetermined threshold and that rate of a part of the exchange target data distributed in the FM package 80 is equal to or larger than a predetermined threshold, the stripe bit may be turned "ON". The striped bit turned "OFF" may indicate that the same stripe group includes only a small amount of exchange target data or the exchange target data is not adequately distributively stored.

The storage controller 62 determines whether or not the stripe bit configured in the defragmentation request is "ON" (second determination) (S244).

If the second determination indicates that the stripe bit is "OFF" (S244: NO), the storage controller 62 executes processing in S184, S186, and S188 illustrated in FIG. 9. The processing is similar to the processing in S184, S186, and S188 illustrated in FIG. 7. That is, the storage controller 62 adopts the first updated parity generation method. Subsequently, the storage controller 62 notifies the file controller 50 of completion of the processing for the defragmentation request (see S190 in FIG. 7) to end the present process.

When the second determination indicates that the stripe bit is "ON" (S244: YES), the storage controller 62 executes the following process.

The storage controller 62 determines whether or not an offload bit is "ON" (S246). The offload bit indicates which of the storage controller 62 and the FM controller 116 is to calculate the XOR between a plurality of data belonging to the stripe group. The offload bit turned "ON" may indicate that the FM controller 116 is to calculate the XOR, and the offload bit turned "OFF" may indicate that the storage controller 62 is to calculate the XOR. The offload bit maybe stored in the shared memory 68 in the storage package 54.

The offload bit may be automatically changed depending on the situation of the storage system 52. When a high processing load is imposed on the storage controller 62, the offload bit may be changed to "ON". An example in which a high processing load is imposed on the storage controller 62 is a business use or the like that involves high normal I/O processing. When a high processing load is imposed on the FM controller 116, the offload bit may be changed to "OFF". An example in which a high processing load is imposed on the FM controller 116 is a case where only a few FM packages 80 are provided for the storage controller 62.

A case where the offload bit is "OFF" (S246: OFF) will be described below.

The storage controller 62 reads from each FM package 80 the data from the target stripe group and stores the data in the buffer memory 58 in the storage package 54 (S248). The data may be stored in the cache memory 60 instead of the buffer memory 58. The ID of the target stripe group may be retrieved from the logical VOL management table 72 and the PG management information 70 based on the logical address of the argument in the defragmentation request.

Then, the storage controller 62 replaces the data stored in the buffer memory 58 with different data in accordance with the defragmentation request and stores the resultant data in the cache memory 60 (S250). When the data is stored in the cache memory 60 instead of the buffer memory 58, the storage controller 62 may replace the data stored in the cache memory 60 with different data and store the different data in a newly reserved area in the cache memory 60.

Then, after completing the replacement process for all the defragmentation target data, the storage controller 62 generates updated parities using data in the stripe group subjected to the replacement process (S252). The processing in S250 and the processing in S252 may be executed asynchronously.

Then, the storage controller 62 identifies the parity storage drive ID 138 corresponding to the stripe group in the stripe group management table 132 corresponding to the PG ID. The storage controller 62 then stores the updated parities in the FM package 80 with the identified parity storage drive ID 138.

Then, the storage controller 62 transmits a defragmentation completion request to the file controller 50 (S190) to end the present process.

A case where the offload bit is "ON" (S246: ON) will be described.

The storage controller 62 executes the data migration process on the FM package 80 having the migration target data related to the defragmentation ID as described in Embodiment 1 using FIG. 8A (S256).

That is, to migrate data between different FM packages 80, the storage controller 62 reads the data from the migration source FM package 80, stores the data in the buffer memory 58, and then stores the data stored in the buffer memory 58, in the migration destination FM package 80, as explained in Embodiment 1.

To migrate the data in the same FM package 80, the storage controller 62 exchanges the PBA 174 corresponding to the migration source LBA 172 for the PBA 174 corresponding to the migration destination LBA 172 in the logical physical map 114 in the same FM package 80 as described in Embodiment 1 using FIG. 8C.

After completing the data migration process for all of the migration target data, the storage controller 62 executes the following process.

The storage controller 62 identifies the FM package 80 storing the un-updated parities belonging to the stripe group (S258).

The storage controller 62 instructs each FM package 80 to transfer updated data belonging to the stripe group to the identified FM package 80 (S260). Upon receiving the instruction, the FM package 80 transfers the updated data thereof belonging to the stripe group to the identified FM package 80.

When all the transfers are completed, the storage controller 62 instructs the identified FM package 80 to generate updated parities (S262). Upon receiving the instruction, the FM package 80 generates updated parities based on the updated data transferred from the other FM packages 80 and exchanges the un-updated parities for the updated parities.

Subsequently, the storage controller 62 executes a data migration determination process similar to that in S188 in FIG. 7 (S264). The storage controller 62 transmits a defragmentation completion notification to the file controller 50 (S266) to end the present process.

According to Embodiment 2, at least one of the following effects can be obtained.

(1) Only the minimum data copying needs to be performed, allowing suppression of the amount of data copying during the defragmentation process.

(2) When the migration destination data and the migration source data are present in the same FM package, the data transfer between the FM packages can be suppressed. This enables a reduction in a data transfer load on a communication path coupling the storage package and the FM packages together.

(3) The data copying process is offloaded onto the FM package side to enable a reduction in the processing load on the storage controller.

(4) The updated parities are generated by the appropriate method according to, for example, arrangement of data to be subjected to the defragmentation process. This enables a reduction in the processing load, the communication load, and the like associated with the generation of the updated parities.

Embodiment 3

Embodiment 3 will be described. In this case, differences from Embodiments 1 and 2 will mainly be described, with description of points common to Embodiments 1 and 2 omitted or simplified.

Figure 10:
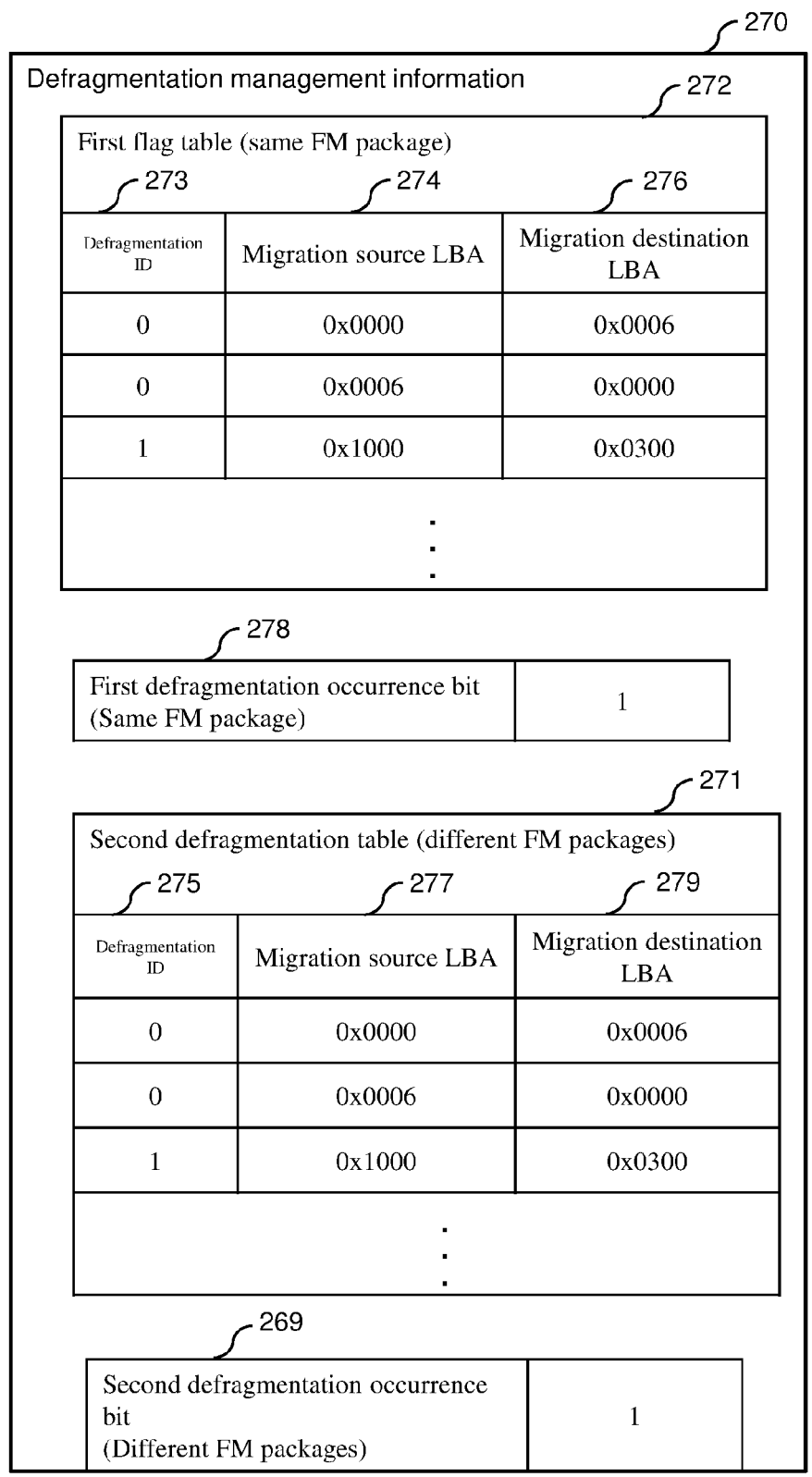
FIG. 10 is a diagram illustrating a data configuration example of defragmentation management information according to Embodiment 3.

FIG. 10 is a diagram illustrating a data configuration example of defragmentation management information 270 according to Embodiment 3.

The defragmentation management information 270 is information utilized for a defragmentation asynchronous process. In the defragmentation asynchronous process, upon receiving a defragmentation request from the file controller 50, the storage controller 62 returns, before completing an actual defragmentation process, a completion notification to the file controller 50 and then executing the actual defragmentation process. That is, in the defragmentation asynchronous process, the storage controller 62 transmits the completion notification for the defragmentation request to the file controller 50 asynchronously with a timing when the actual defragmentation process is completed. This enhances response performance for the defragmentation request. An example in which the response performance for the defragmentation request needs to be enhanced is a case where the defragmentation process frequently occurs during routine work.

The defragmentation management information 270 may include a first defragmentation table 272 and a first defragmentation occurrence bit 278 configured to manage the defragmentation process in the same FM package 80 and a second defragmentation table 271 and a second defragmentation occurrence bit 269 configured to manage the defragmentation process between different FM packages 80. The defragmentation management information 270 may be stored in the shared memory 68 in the storage package 54.

The first defragmentation table 272 has a defragmentation ID 273, a migration source logical address 274, and a migration destination logical address 276 as field values. Similarly, the second defragmentation table 271 has a defragmentation ID 275, a migration source logical address 277, and a migration destination logical address 279 as field values.

The storage controller 62 stores the defragmentation ID corresponding to the received defragmentation request and the migration source logical address and migration destination logical address configured in the argument in the defragmentation request, in the first defragmentation table 272 or the second defragmentation table 271.

When the migration source logical address and the migration destination logical address in the defragmentation request belong to the same FM package 80, the storage controller 62 stores these pieces of information in the first defragmentation table 272 and changes the first defragmentation occurrence bit 278 to ON.

When the migration source logical address and the migration destination logical address in the defragmentation request belong to different FM packages 80, the storage controller 62 stores these pieces of information in the second defragmentation table 271 and changes the second defragmentation occurrence bit 269 to ON.

One defragmentation table and one defragmentation occurrence bit may be provided for the storage system or for each FM package.

Figure 11:
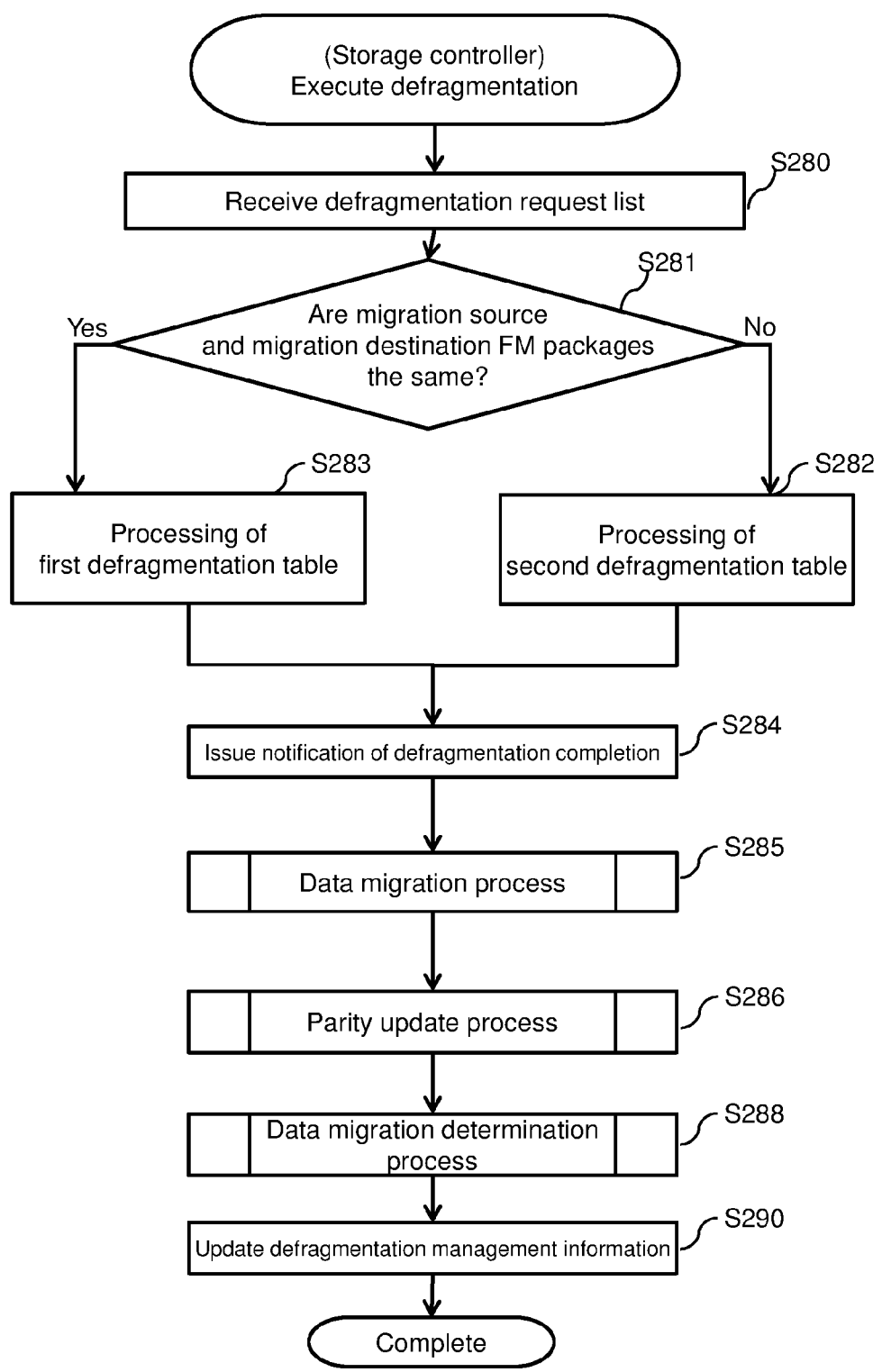
FIG. 11 is a flowchart illustrating an example of a defragmentation process according to Embodiment 3.

FIG. 11 is a flowchart illustrating an example of the defragmentation process according to Embodiment 3.

Upon receiving the defragmentation request list, the storage controller 62 analyzes the defragmentation requests included in the defragmentation request list (S280). This process is similar to the processing in S182 in FIG. 7.

The storage controller 62 determines whether or not the migration source LBA and the migration destination LBA belong to the same FM package 80 for all the defragmentation requests in the defragmentation request list (S281).

If the migration source LBA and the migration destination LBA belong to the same FM package 80 for all the defragmentation requests in the defragmentation request list (S281: YES), the storage controller 62 executes the following process. That is, the storage controller 62 changes information related to the defragmentation requests included in the defragmentation request list in the first defragmentation table 272 and changes the first defragmentation occurrence bit 278 to "ON" (S283). The storage controller 62 proceeds to processing in S190.

If the migration source LBA and the migration destination LBA in the defragmentation request belong to different FM packages 80 (S281: NO), the storage controller 62 executes the following process. That is, the storage controller 62 stores the information on the defragmentation requests included in the defragmentation request list, in the second defragmentation table 271, and changes the second defragmentation occurrence bit 269 to "ON" (S282). The storage controller 62 proceeds to the processing in S190.

In the processing in S190, the storage controller 62 transmits a defragmentation completion notification to the file controller 50 (S284). Then, the storage controller 62 executes the defragmentation process (S285 to S288). The defragmentation process in S285 to S288 is as described for S184 to S188 in FIG. 7.

After transmitting the defragmentation completion notification (S284), the storage controller 62 may immediately proceed to the processing in S285. Alternatively, the storage controller 62 may proceed to the processing in S285 after a predetermined number of pieces of information or more on the defragmentation request are stored in the defragmentation management information 270. Alternatively, the storage controller 62 may check the first defragmentation occurrence bit 278 (second defragmentation occurrence bit 269) with a given period, and when the bit changes to "ON", proceed to the processing in S285.

After the processing in S288 is completed, the storage controller 62 updates the defragmentation management information (S290). For example, the storage controller 62 deletes records of defragmentation IDs for which defragmentation has been completed from the first defragmentation table 272 or the second defragmentation table 271.

Then, after deleting the records from the first defragmentation table 272, the storage controller 62 may check whether or not the first defragmentation table 272 still includes any record. If the first defragmentation table no longer includes any record, the storage controller 62 may change the first defragmentation occurrence bit 278 to "OFF". The storage controller 62 may execute a similar process on the second defragmentation table 271 and the second defragmentation occurrence bit 269.

If all the defragmentation occurrence bits 278 and 269 included in the defragmentation management information 270 change to "OFF", the storage controller 62 may determine that the defragmentation process has been completed.

Figure 12:
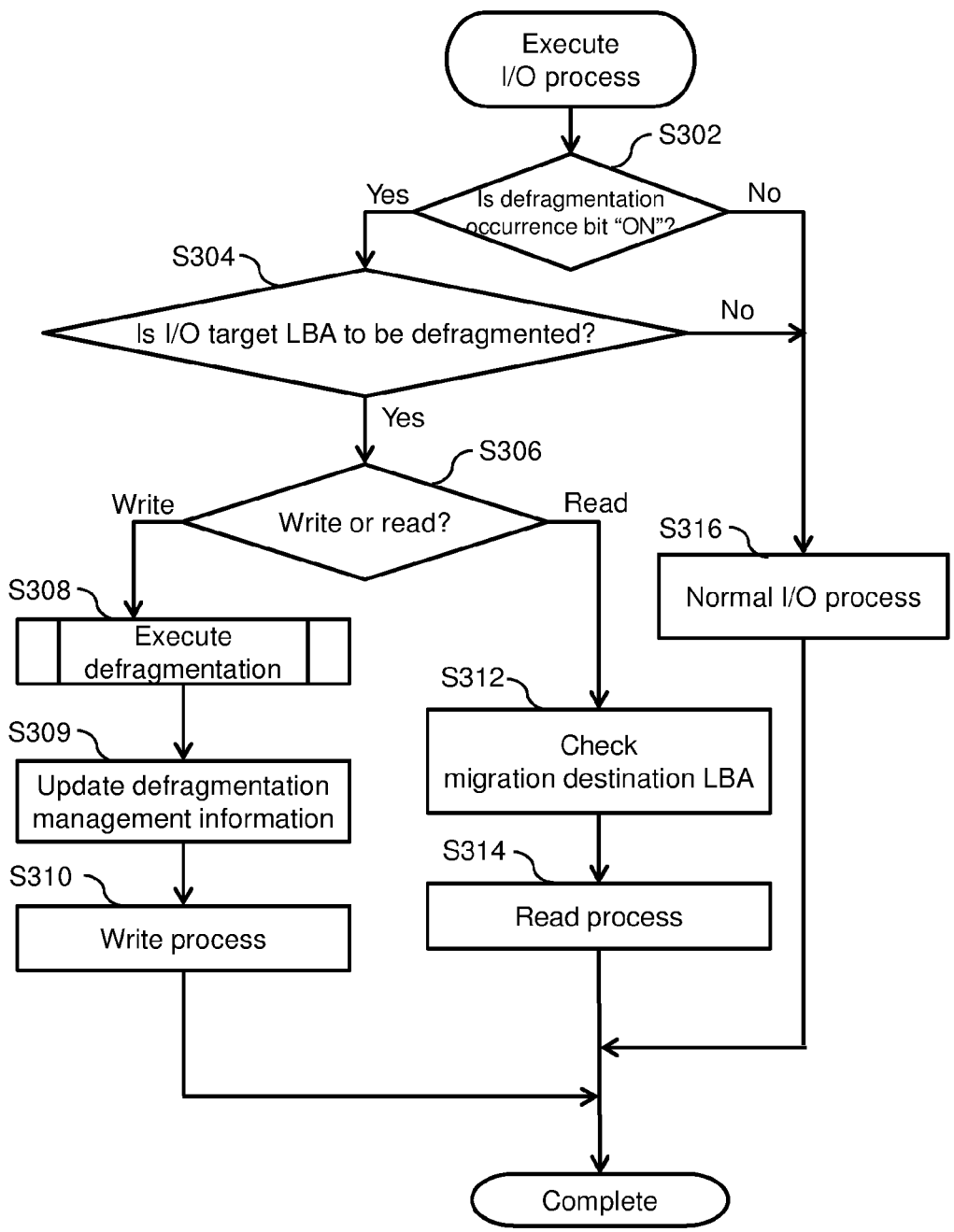
FIG. 12 is a flowchart illustrating an example of an I/O process according to Embodiment 3.

FIG. 12 is a flowchart illustrating an example of an I/O process according to Embodiment 3.

In Embodiment 3, even when the defragmentation completion notification is transmitted to the file controller 50, the actual defragmentation process may not have been completed. Thus, when receiving an I/O request from the file controller 50, the storage controller 62 may execute a process as described below.

The storage controller 62 determines whether or not at least one of the first defragmentation occurrence bit 278 and the second defragmentation occurrence bit 269 is "ON" (S302). When the defragmentation table and the defragmentation occurrence bit are provided for each FM package 80, the storage controller 62 may make determination for the first defragmentation occurrence bit 278 and the second defragmentation occurrence bit 269 related to the I/O target FM package 80.

If both the first defragmentation occurrence bit 278 and the second defragmentation occurrence bit 269 are "OFF" (S302: NO), the storage controller 62 executes a normal I/O process (S316) to complete the present process.

If at least one of the first defragmentation occurrence bit 278 and the second defragmentation occurrence bit 269 is "ON" (S302: YES), the storage controller 62 executes the following process.

The storage controller 62 determines whether or not an I/O target logical address is to be subjected to the defragmentation process (S304). For example, the storage controller 62 retrieves the I/O target logical address from each of the migration source logical addresses 274 and 277 in the first defragmentation table 272 and the second defragmentation table 271, and makes the above-described determination.

If only the first defragmentation occurrence bit 278 is "ON", the storage controller 62 may use only the migration source logical address 274 in the first defragmentation table 272 as a retrieval target. If only the second defragmentation occurrence bit 269 is "ON", the storage controller 62 may use only the migration source logical address 277 in the second defragmentation table 271 as a retrieval target.

When the first defragmentation table 272 and the first defragmentation occurrence bit 278 are provided for each FM package 80 and only the first defragmentation occurrence bit 278 related to the I/O target FM package 80 is "ON", the storage controller 62 may use only the migration source logical address 274 in the first defragmentation table 272 related to the I/O target FM package 80 as a retrieval target.

If the I/O target logical address is not included in the targets of the defragmentation process (S304: NO), the storage controller 62 executes the normal I/O process to end the present process as is the case with S316 described above.

If the I/O target logical address is included in the targets of the defragmentation process (S304: YES), the storage controller 62 determines whether the type of the I/O process is read or write (S306).

If the type of the I/O process is write (S306: write), the storage controller 62 executes the following process.

After executing the defragmentation process illustrated in FIG. 11 (S308), the storage controller 62 updates the defragmentation management information 270 (S309). The storage controller 62 then executes a write process (S310) to complete the present process.

If the type of the I/O process is read (S306: read), the storage controller 62 executes the following process.

The storage controller 62 references the defragmentation management information 270 to identify the migration destination LBA corresponding to the LBA designated in the read request (S312). The storage controller 62 then accesses the migration destination LBA to read the data (S314) to complete the present process.

According to Embodiment 3, at least one of the following effects can be obtained.

(1) Only the minimum data copying needs to be performed, allowing suppression of the amount of data copying during the defragmentation process.

(2) When the migration destination data and the migration source data are present in the same FM package, the data transfer between the FM packages can be suppressed. This enables a reduction in a data transfer load on a communication path coupling the storage package and the FM packages together.

(3) The performance of the normal I/O process can be restrained from being deteriorated during execution of the defragmentation process.

Embodiment 4

Figure 13:
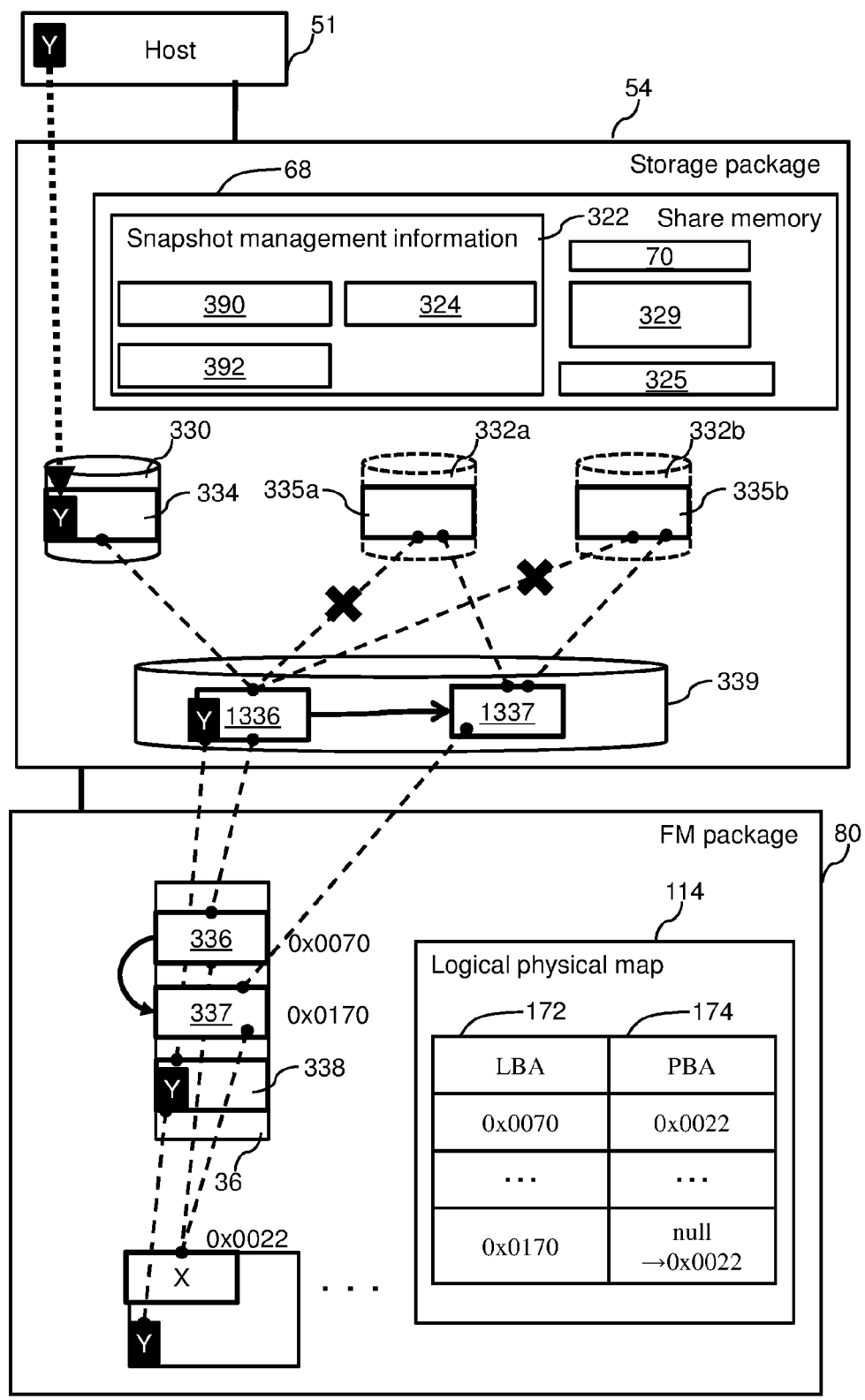
FIG. 13 is a schematic diagram schematically illustrating a write process executed when differential snapshots are applied according to Embodiment 4.

Embodiment 4 will be described. In this case, differences from Embodiments 1 to 3 will mainly be described, with description of points common to Embodiments 1 to 3 omitted or simplified. FIG. 13 is a schematic diagram schematically illustrating a write process executed when differential snapshots are applied according to Embodiment 4.

A configuration in FIG. 13 is different from the configuration in FIG. 2 in that the host 51 is coupled directly to the storage package 54 rather than to the file controller 50, but the remaining part of the configuration in FIG. 13 is similar to the corresponding part of the configuration in FIG. 2. Furthermore, the shared memory 68 in the storage package 54 further has snapshot management information 322 and a snapshot mode 325.

The snapshot management information 322 includes primary VOL management information 390, secondary VOL management information 392, and pool management information 324.

The primary VOL management information 390 is information used to manage a primary VOL 330 that is a logical VOL in a snapshot source. The secondary VOL management information 392 is information used to manage secondary VOL 332 that is a logical VOL corresponding to a replica of the primary VOL 330. For the primary VOL 330 and the secondary VOL 332, at least the secondary VOL 332 may be a virtual logical VOL.

The pool management information 324 is information used to manage a pool 339 in which differential data between the primary VOL 330 and the secondary VOL 332 is stored.

The snapshot mode 325 may be "ON" when snapshots are applied to the storage system 52 and may be "OFF" when the snapshots are not applied to the storage system 52. The snapshot mode 325 may be present for each primary VOL or may be common to a plurality of primary VOLs.

A logical VOL management table 329 may have a field value for the VOL type, in addition to the field values illustrated in the logical VOL management table 72 in FIG. 5. The VOL type may be a value indicating whether the logical VOL with the logical VOL ID 140 is a primary VOL, a secondary VOL, or any other value.

An example of a case will be described where the host 51 issues a write request for data Y to the primary VOL 330 in FIG. 13. At this time, to avoid confusion, a unit logical area for each of the primary VOL 330, the secondary VOL 332, and the pool 339 is referred to as a "segment", and a unit logical area for logical spaces (sub logical spaces) is referred to as a "logical page". In particular, segments of each of the primary VOL 330 and the secondary VOL 332 are referred to as "virtual segments", and segments of the pool 339 are referred to as "pool segments". Furthermore, the virtual segments at least of the secondary VOL and the pool segments may each be partitioned into two or more areas that may be referred to as "subsegments". The pool segments or the pool subsegments and the logical pages may correspond to one another on a one-to-one basis.

A write destination virtual segment (a virtual segment in the primary VOL 330) 334 for the data Y references a pool segment 1336. The pool segment 1336 is also referenced by a virtual segment 335a in a secondary VOL 332a and a virtual segment 335b in a secondary VOL 332b. That is, the pool segment 1336 is shared by the primary VOL 330, the secondary VOL 332a, and the secondary VOL 332b.

In this case, the storage controller 62 executes the following process.

(K1) The storage controller 62 copies data in the pool segment 1336 to another pool segment (copy destination segment) 1337.

(K2) The storage controller 62 switches a reference destination for the virtual segments 335a and 335b to the copy destination pool segment 1337.

(K3) The storage controller 62 overwrites the virtual segment 334 (pool segment 1336) with the data Y.

Data copying from the copy source pool segment 1336 to the copy destination pool segment 1337 may be the following virtual copying process. The virtual copying process may be executed as follows.

(L1) The storage controller 62 determines whether or not to be able to reserve a copy destination logical page in the same FM package 80 as having the logical page 336 allocated to the copy source pool segment 1336. For example, if the same FM package 80 includes an empty logical page (for example, 337) to which no physical page is allocated, the determination result in (L1) may be affirmative, that is, may indicate that a copy destination logical page can be reserved.

(L2) If the determination result in (L1) is affirmative, the storage controller 62 transmits, to the FM package 80, a virtual copy instruction designating a copy source LBA (the LBA of the copy source logical page 336) and a copy destination LBA (the LBA of the reserved copy destination logical page 337). The FM controller 116 in the FM package 80 receives the virtual copy instruction to update the logical physical map 114 in response to the virtual copy instruction. Specifically, the FM controller 116 associates the copy destination LBA with the same PBA as that which is associated with the copy source LBA.

The storage controller 62 may generate updated parities for each of a stripe group including the newly reserved logical page 337 and a stripe group including data overwritten with the data Y. The size of the write data need not be equal to the size of the virtual copy.

Figure 14:
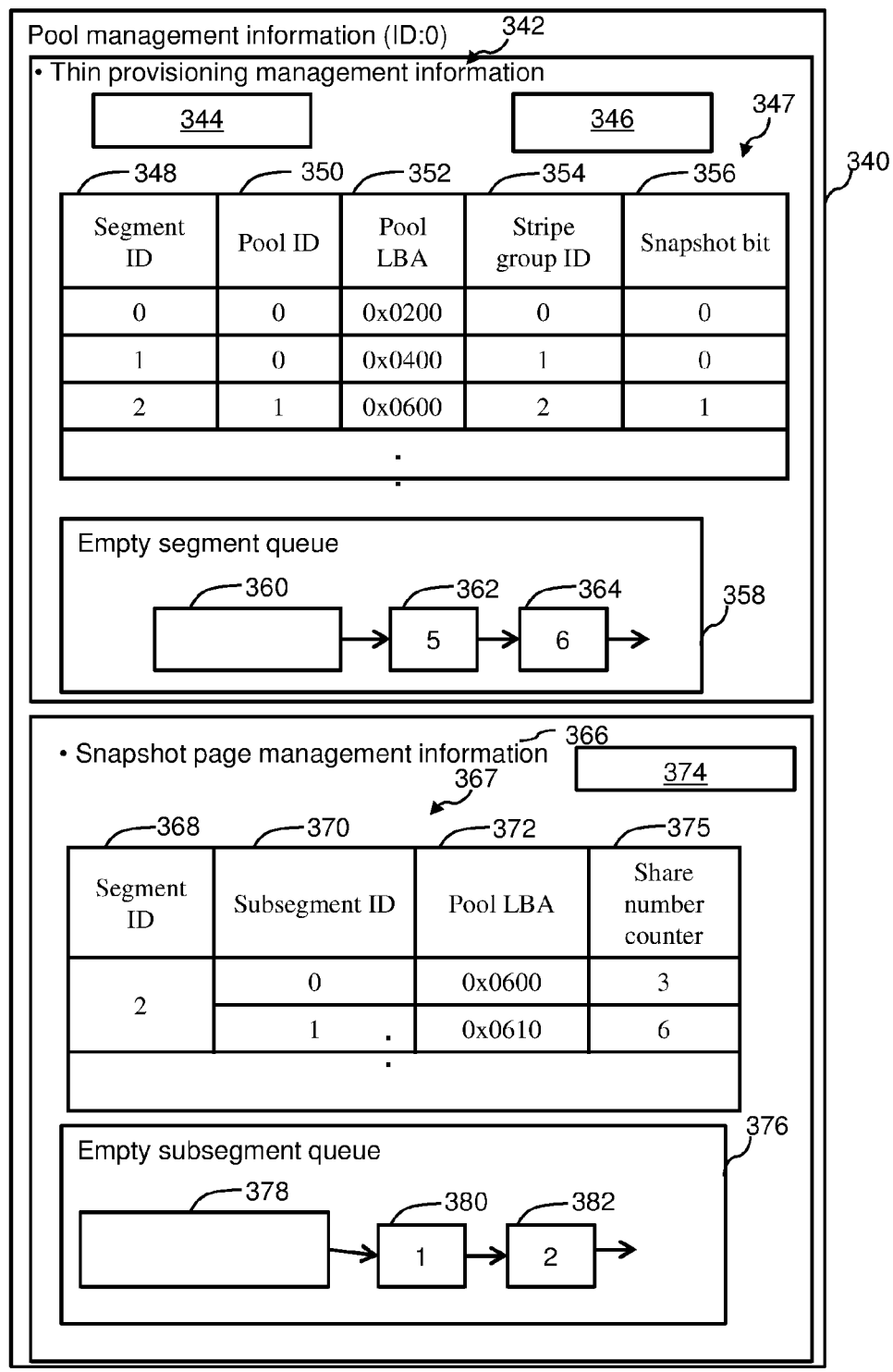
FIG. 14 is a diagram illustrating a data configuration example of pool management information according to Embodiment 4.

FIG. 14 is a data configuration diagram illustrating an example of pool management information 340 according to Embodiment 4.

The pool management information 340 is information used to manage one pool. Therefore, the storage controller 62 may have the pool management information 340 for each pool.

The pool management information 340 has thin provisioning management information 342 and snapshot management information 366.

The thin provisioning management information 342 is information used to manage pool segments allocated to a virtual VOL. The virtual VOL is a virtual logical VOL configured based on thin provisioning.

The thin provisioning management information 342 includes segment size management information 344, pool configuration information 346, a thin provisioning management table 347, and an empty segment queue 358 related to thin provisioning.

The segment size management information 344 is information indicative of the size of a pool segment.

The pool configuration information 346 is information used to manage pool segments. In the present embodiment, the pool segment is a logical area to which one logical page is allocated. However, the pool segment may be a logical area to which two or more logical pages provided by two or more FM packages 80 area allocated.

The thin provisioning management table 347 has information on each pool segment related to thin provisioning. The thin provisioning management table 347 has a segment ID 348, a pool ID 350, a pool LBA 352, a stripe group ID 354, and a snapshot bit 356 as field values.

The segment ID 348 is information used to identify each pool segment. The pool ID 350 is indicative of a pool to which the pool segment with the segment ID 348 belongs. The pool LBA 352 is an LBA indicative of the pool segment with the segment ID 348. The stripe group ID 354 is the ID of a stripe group to which the pool segment with segment ID 348 belongs.

The snapshot bit 356 is information used to determine whether or not the pool segment with the segment ID 348 is used for the snapshot described below. The snapshot bit 356 turned "ON" indicates that the pool segment with the segment ID 348 is used for the snapshot. The snapshot bit 356 turned "OFF" indicates that the pool segment with the segment ID 348 is not used for the snapshot.

The empty segment queue 358 related to thin provisioning allows empty segments to be managed.

In the empty segment queue 358 related to thin provisioning illustrated in FIG. 14, a leading pointer 360 of the empty queue related to thin provisioning indicates that a segment ID 362 "5" and a segment ID 364 "6" are enqueued. In other words, the leading pointer 360 indicates that the segments with the segment IDs "5" and "6" are empty.

The snapshot management information 366 includes subsegment size management information 374, a snapshot management table 367, and an empty subsegment queue 376 related to snapshot.

The subsegment size management information 374 is information indicative of the size of a subsegment that is a unit of a snapshot.

The snapshot management table 367 has information on subsegments related to snapshots.

The snapshot management table 367 has a segment ID 368, a subsegment ID 370, a pool LBA 372, and a share number counter 375.

The subsegment ID 370 is information used to identify subsegments into which the segment with the segment ID 368 is divided. The pool LBA 372 is an LBA indicative of the subsegment with the subsegment ID 370. The share number counter 375 is a value indicative of the number of sub VOLs sharing the subsegment with the subsegment ID 370. The pool LBA 372 corresponding to a subsegment and the pool LBA 352 corresponding to a segment may be managed in the same logical space or in different logical spaces.

The subsegment queue 376 related to snapshot allows empty subsegments to be managed.

In the subsegment queue 376 related to snapshot illustrated in FIG. 14, a leading pointer 378 of the empty subsegment queue related to snapshot indicates that a subsegment ID 380 "1" and a subsegment ID 382 "2" are enqueued. In other words, the leading pointer 378 indicates that the subsegments with the subsegment IDs "1" and "2" are empty.

Figure 15:
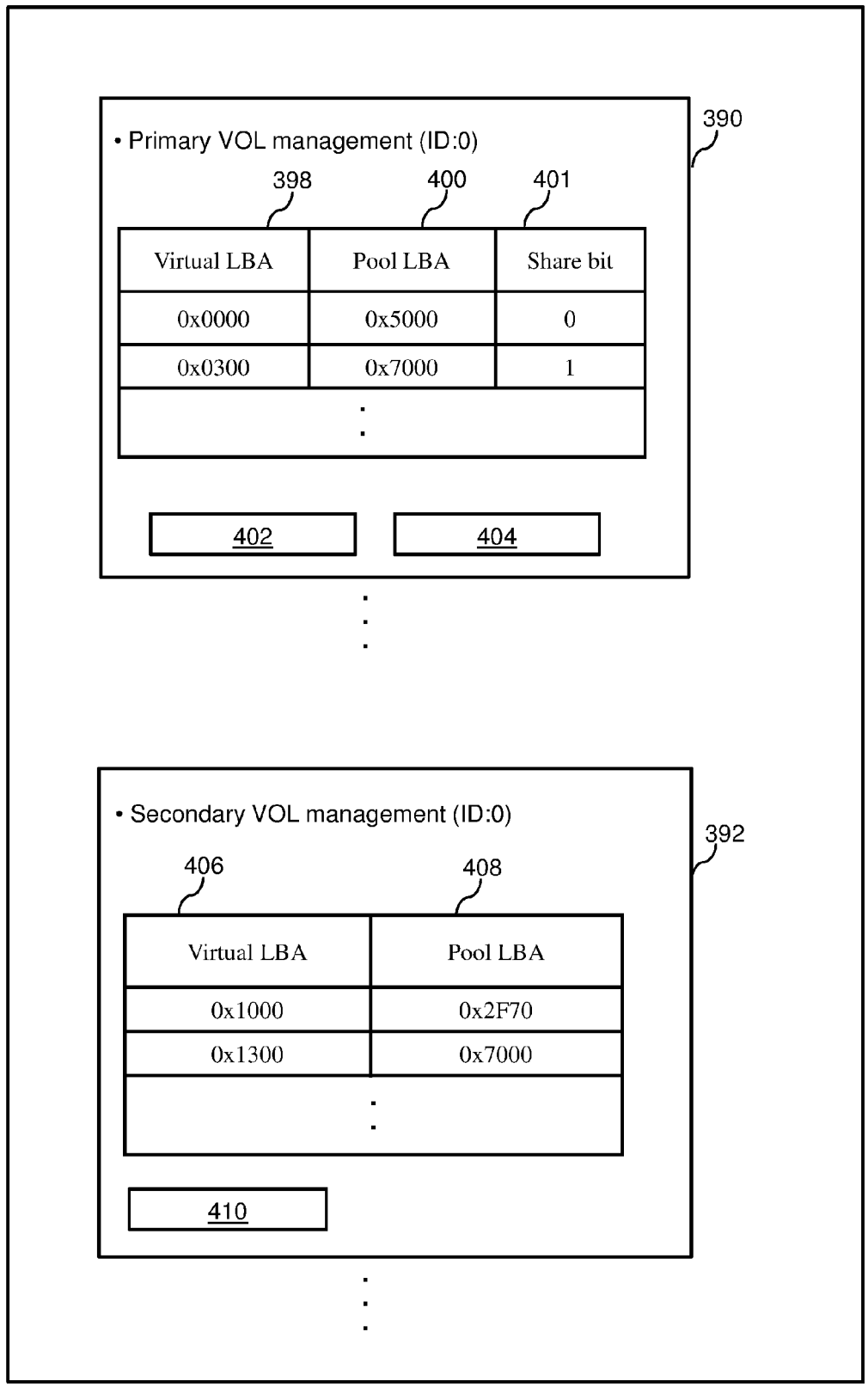
FIG. 15 is a diagram illustrating a data configuration example of primary VOL management information and secondary VOL management information according to Embodiment 4.

FIG. 15 is a data configuration diagram illustrating an example of primary VOL management information 390 and secondary VOL management information 392 according to Embodiment 4.

The primary VOL management information 390 is information used to manage one primary VOL. The secondary VOL management information 392 is information used to manage one secondary VOL.

The primary VOL management information 390 has a virtual LBA 398, a pool LBA 400, and a share bit 401 for each of the virtual segments forming the primary VOL. The virtual LBA 398 is the LBA of a virtual segment. The pool LBA 400 is the LBA of a pool segment associated with the virtual segment.

The virtual LBA 398 may be managed in units of subsegments of a snapshot. For example, a virtual LBA 398 "0x0000" to which the size of the subsegment is added may be the next virtual LBA 398 "0x0300".

The share bit 401 is information indicating whether or not the pool segment associated with the virtual segment is shared with the secondary VOL. For example, at least a part of the pool segment associated with the virtual segment of the share bit 401 "1" is shared with secondary VOL. The pool segment associated with the virtual LBA 398 of the share bit 401 "0" is not shared with the secondary VOL (non-shared state).

The primary VOL management information 390 has secondary VOL ID information 402 and pool ID information 404. The secondary VOL ID information 402 has the ID of the secondary VOL corresponding to the primary VOL in the primary VOL management information 390. The pool ID information 404 has the ID of a pool serving as a source of a pool segment allocated to the primary VOL in the primary VOL management information 390.

The secondary VOL management information 392 has a virtual LBA 406 and a pool LBA 408 for each of the virtual segments forming the secondary VOL. The pool LBA 408 is the LBA of a pool segment associated with the virtual segment. The primary VOL ID information 410 has the ID of the primary VOL corresponding to the secondary VOL in the secondary VOL management information 392.

Figure 16:
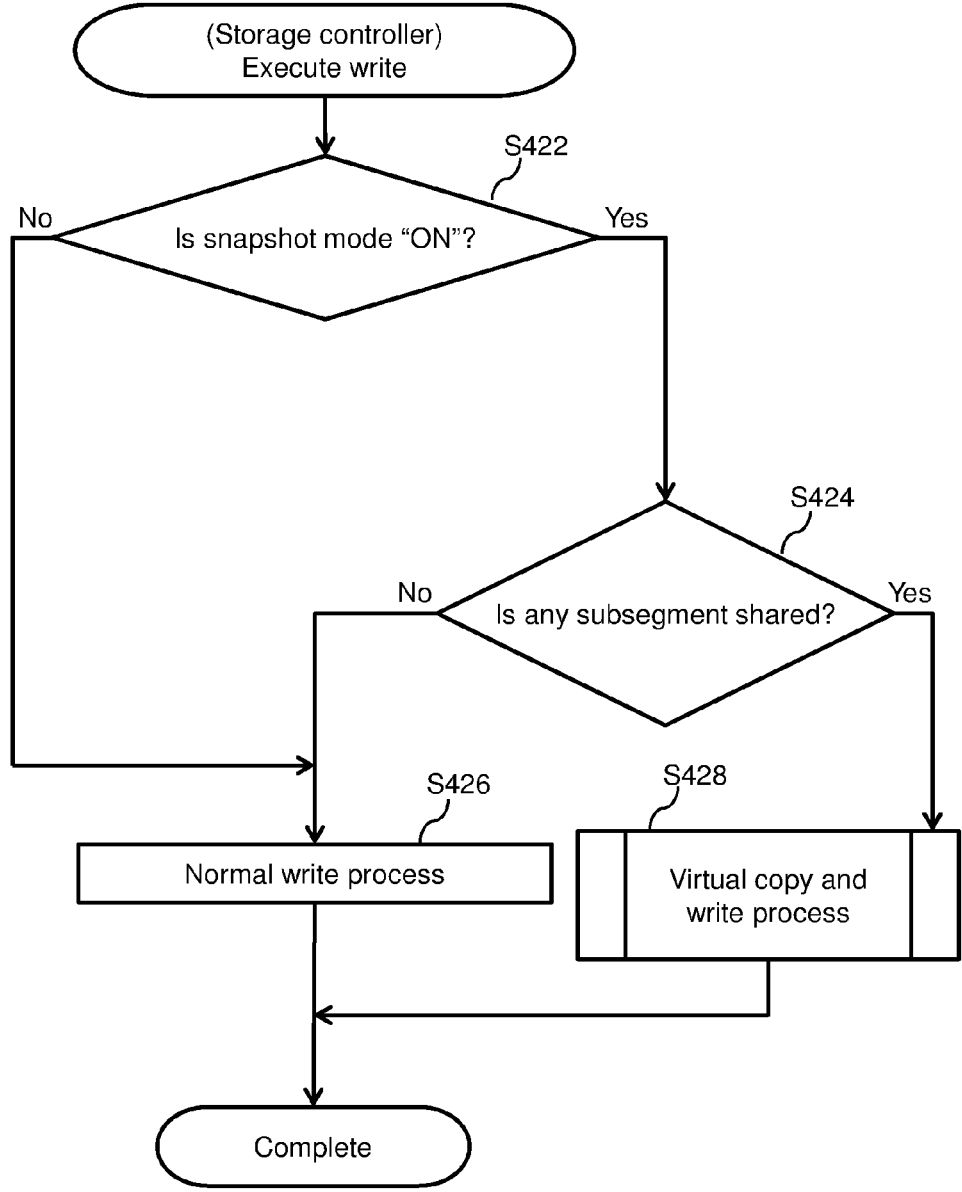
FIG. 16 is a flowchart illustrating an example of a write process according to Embodiment 4.

FIG. 16 is a flowchart illustrating an example of a write process according to Embodiment 4.

The storage controller 62 determines whether or not the snapshot mode 325 for the write destination virtual VOL designated in a write request from the host 51 is "ON" (S422).

If the snapshot mode 325 is "OFF" (S422: NO), the storage controller 62 executes the normal write process (S426) to complete the present process. In S426, the write process is executed in accordance with the write request.

If the snapshot mode 325 is "ON" (S422: YES), the storage controller 62 determines whether or not the write destination virtual LBA (the LBA designated as a write destination) is shared with another virtual VOL (S424).

If the write destination virtual VOL is a primary VOL, the storage controller 62 determines whether the share bit 401 corresponding to the write destination virtual LBA 398 in the primary VOL management information 390 indicates a "shared state" or a "non-shared state".

If the write destination virtual VOL is a secondary VOL, the storage controller 62 determines whether or not the pool LBA 408 corresponding to the write destination virtual LBA 406 in the secondary VOL management information 392 matches any of the pool LBAs 400 in the primary VOL management information 390 corresponding to the secondary VOL management information 392. Here, if the pool LBA 408 matches the any of the pool LBAs 400, the storage controller 62 determines that the "shared state" is established. If the pool LBA 408 does not match any of the pool LBAs 400, the storage controller 62 further retrieves the pool LBA 372 matching any of the pools LBA 408 from the snapshot management information 366 and determines whether or not the share number counter 375 corresponding to the pool LBA 372 indicates a value other than "0". Here, if the matching pool LBA 372 is discovered and the share number counter 275 is indicative of a value other than "0", the storage controller 62 determines the "shared state" is established. Otherwise, the storage controller 62 determines that the "non-shared state" is established.

If the write destination virtual LBA is in the "non-shared state" (S424: NO), the storage controller 62 executes the normal write process (S426) to complete the present process.

If the write destination virtual LBA is in the "shared state" (S424: YES), the storage controller 62 executes a virtual copy process and a write process on the FM package 80 (S428) to complete the present process. This process will be described below (see FIG. 17).

Figure 17:
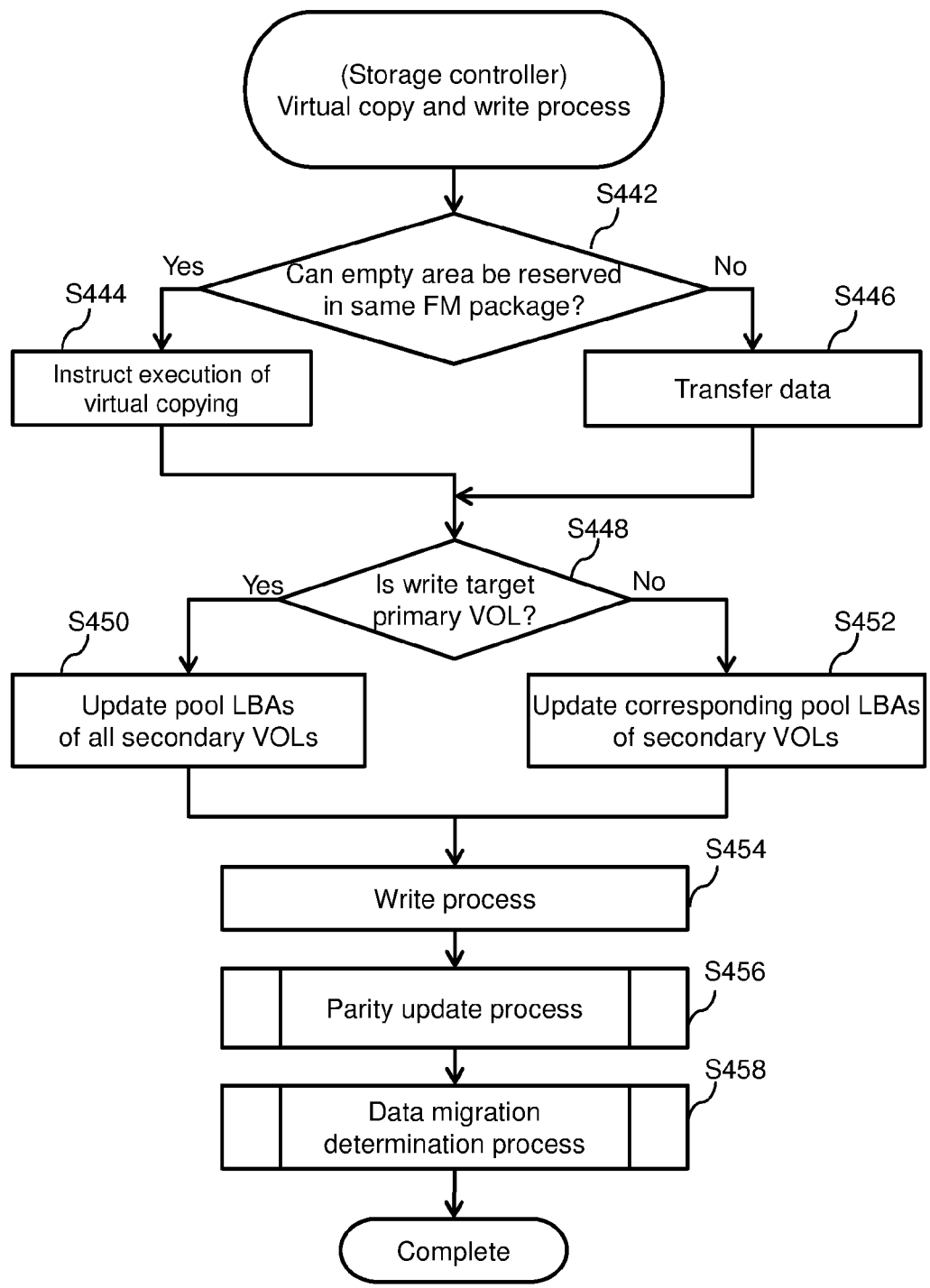
FIG. 17 is a flowchart illustrating an example of a virtual copy process and a write process according to Embodiment 4.

FIG. 17 is a flowchart illustrating an example of the virtual copy process and the write process corresponding to Embodiment 4.

The storage controller 62 inquires of the virtual-copy-source FM controller 116 as to whether or not an LBA for virtual copying can be reserved in the FM package 80 of the virtual-copy-source FM controller 116 (S442). Upon receiving the inquiry, the FM package 80 references the logical block information 164 to determine whether or not the LBA can be reserved, and returns the determination result to the storage controller 62.

If the determination by the virtual-copy-source FM controller 116 is affirmative (S442: YES), the storage controller 62 executes the following process. The storage controller 62 instructs the virtual-copy-source FM controller 116 to execute virtual copying (S444). Upon receiving the instruction, the FM package 80 executes virtual copying. That is, the FM package 80 reserves an LBA for the virtual copy destination in the logical physical map 114, and associates the reserved LBA with the PBA of the virtual copy source. The storage controller 62 then proceeds to processing in S448.

If the determination by the copy source FM controller 116 is negative (S442: NO), the storage controller 62 executes the following process. The storage controller 62 reserves an LBA for virtual copying in another FM controller 116. The storage controller 62 then transmits data indicative of the LBA of the virtual copy source to the FM package 80 with the LBA of the virtual copy destination reserved therein (S446). This data transmission may be performed via the buffer memory 58 in the storage package 54. Alternatively, the data transmission may be performed only via the switch 78 to which the FM packages 80 are coupled (see Embodiment 5) rather than via the buffer memory 58 in the storage package 54. The storage controller 62 then proceeds to processing in S448.

In the processing in S448, the storage controller 62 determines whether or not the write target is a primary VOL (S448). The storage controller 62 may make this determination using information resulting from the retrieval in S422 for determining whether the write target is a primary VOL or a secondary VOL.

If the write target is a primary VOL (S448: YES), the storage controller 62 executes the following process. The storage controller 62 changes the pool LBAs 408 of the all the secondary VOLs sharing the pool LBA 400 corresponding to the write target virtual LBA 398, to the pool LBA of the virtual copy destination (S450). The storage controller 62 may retrieve the secondary VOLs sharing the pool LBA 400 corresponding to the write target virtual LBA as described below. That is, the storage controller 62 identifies a secondary VOL ID indicated by the secondary VOL ID information 402 in the primary VOL management information 390. The storage controller 62 retrieves the same pool LBA 408 as the pool LBA 400 of the write target virtual LBA from the secondary VOL management information 392 on the identified secondary VOL ID. The storage controller 62 changes the same pool LBA 408 and then changes the share bit 401 such that the share bit 401 is indicative of the "non-shared state". The storage controller 62 stops the retrieval when the share bit 401 is changed to indicate the "non-shared state", completing the process of changing the pool LBA. The storage controller 62 then proceeds to processing in S454.

If the write target is a secondary VOL (S448: NO), the storage controller 62 executes the following process. The storage controller 62 changes the pool LBA 408 shared by the secondary VOLs to the pool LBA of the virtual copy destination, and sets the share bit 401 of the virtual-copy-source primary VOL ID corresponding to the shared pool LBA 400 such that the share bit 401 is indicative of the "non-shared state" (S452). The storage controller 62 then proceeds to the processing in S454.

In processing in S454, the storage controller 62 executes an overwrite process as usual (S454). This is because saving of shared data has been completed.

The storage controller 62 then executes the parity update process (S456) and the data migration determination process (S458) as is the case with FIG. 7 to complete the present process.

Embodiment 5

Embodiment 5 will be described. In this case, differences from Embodiments 1 to 4 will mainly be described, with description of points common to Embodiments 1 to 4 omitted or simplified.

Figure 18:
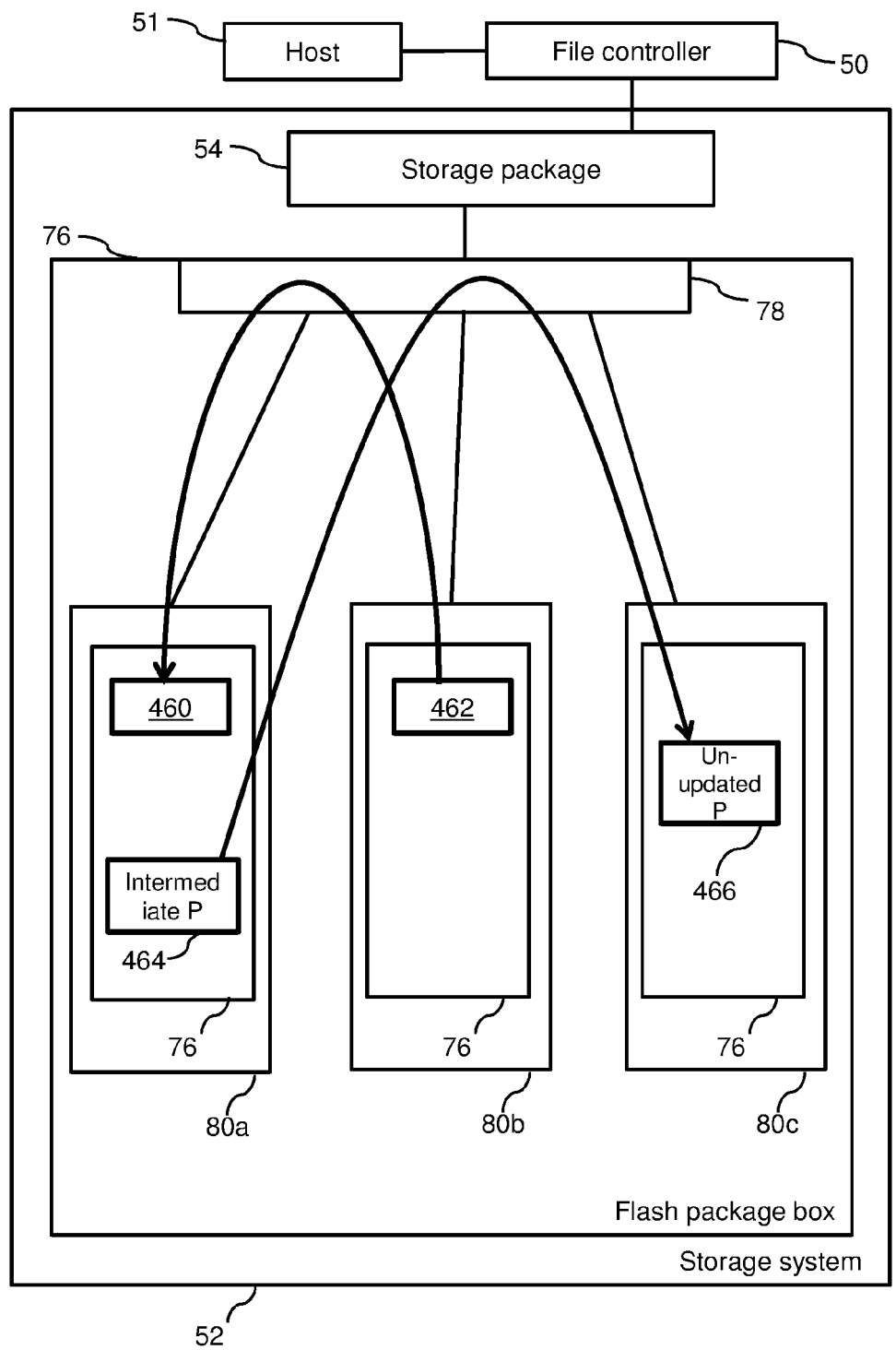
FIG. 18 is a schematic diagram schematically illustrating a data migration process and a parity update process executed between FM packages according to Embodiment 5.

FIG. 18 is a schematic diagram schematically illustrating that the data migration process and the updated parity generation process are executed between the FM packages 80 according to Embodiment 5.

In the defragmentation process illustrated in Embodiment 1, data is migrated between different FM packages 80 via the buffer memory 58 in the storage package 54.

In contrast, in a defragmentation process in Embodiment 5, data is migrated between different FM packages 80 via the switch 78 provided for the FM package boxes 76 rather than via the buffer memory 58 in the storage package 54.

Furthermore, in the defragmentation process according to Embodiment 5, intermediate parities generated by a certain FM package 80 are transmitted to an FM package 80 having un-updated parities via the switch 78 provided for the FM package boxes 76 rather than via the buffer memory 58 in the storage package 54.

With reference to FIG. 18, a process will be described in which data corresponding to a logical page 462 in the FM package 80b is migrated to the FM package 80a.

The process according to Embodiment 5 is different from the process according to Embodiment 1 in the processing in S202 in FIG. 8A and the processing in S210 in FIG. 8B, and the remaining part of the process according to Embodiment 5 is substantially the same as the corresponding part of the process according to Embodiment 1. Only the different parts of the process will be described below.

In the processing in S202 in FIG. 8A, the storage controller 62 transmits the ID of the migration destination FM package 80a to the migration source FM package 80b.

The controller in the migration source FM package 80b instructs the migration destination FM package 80a to reserve an area where data to be migrated is to be stored. Alternatively, the storage controller 62 instructs the migration destination FM package 80a to reserve the area.

The controller in the migration source FM package 80b issues a write command to the migration destination FM package 80a and transmits the corresponding data. The data is transmitted to the migration destination FM package 80a via the switch 78.

On the processing in S210 in FIG. 8B, intermediate parities 464 are transferred to the FM package 80c having un-updated parities 466 as is the case with S202. Alternatively, one of the plurality of FM packages 80 in the FM package box 76 may be configured as a representative FM package 80, and the processing in S200, S202, S208, and S210 described above may be executed as follows.

In the description, the FM package 80c is assumed to be configured as a representative. The representative FM package 80c may be one or more FM packages in the FM package box 76. When the representative FM package 80c is configured, the PG management information 70 may be stored in the shared memory 68 in the storage package or in the main memory 102 in the representative FM package 80c.

In the processing in S200 in FIG. 8A, when the PG management information 70 is not stored in the shared memory 68 in the storage controller 62, the migration source FM package 80b makes an inquiry to the representative FM package 80c.

In the processing in S202 in FIG. 8A, the migration source FM package 80b issues a data transfer start preparation command to the representative FM package 80c. Upon receiving the data transfer start preparation command, the representative FM package 80c transmits, to the migration destination FM package 80a, a command to reserve a storage area for the migration source data. The representative FM package 80c transmits the ID of the migration destination FM package 80a to the migration source FM package 80b. Upon receiving the ID of the migration destination FM package 80a, the migration source FM package 80b transmits the migration target data to the migration destination FM package 80a.

In S208 in FIG. 8B, when the PG management information 70 is not stored in the shared memory 68 of the storage controller 62, the FM package 80a having generated the intermediate parities 464 makes an inquiry to the representative FM package 80c.

In S210 in FIG. 8B, the FM package 80a transmits the intermediate parities 464 to the FM package 80c having the un-updated parities 466, similarly to S202 above.

Embodiment 5 enables at least one of the following effects to be produced.

(1) Only the minimum data copying needs to be performed, allowing suppression of the amount of data copying during the defragmentation process.

(2) In such a write-once storage system as involves fragmentation of an empty area resulting from repeated read and write processes, the defragmentation process can be executed without using the storage controller.

(3) The data copying process is offloaded onto the FM package side to enable a reduction in the processing load on the storage controller.

The above-described embodiments are illustrative for description of the present invention and are not intended to limit the scope of the present invention to the embodiments. Those skilled in the art may implement the present invention in many other aspects without departing from the spirits of the present invention. For example, the number of storage devices forming the parity group may be larger than the number of stripes forming the stripe group.

REFERENCE SIGNS LIST

52 storage system
54 Storage package
62 Storage controller
80 FM package
116 FM controller

The invention claimed is:

1. A storage system comprising:
a plurality of storage devices;
a storage controller configured to control the plurality of storage devices,
wherein each of the plurality of storage devices is configured to provide a sub logical space to the storage controller and manage correspondence relations between physical addresses and logical addresses in the storage device,
the storage controller is configured to:
manage a logical space that is a space based on a plurality of sub logical spaces provided by the plurality of storage devices,
when first data that is one of a plurality of data in the logical space is exchanged for second data that is one of the plurality of data, make a first determination to determine whether or not the first data and the second data are stored in the same storage device, and
when a result of the first determination is affirmative, replace, in the storage device, a logical address corresponding to the first data with a logical address corresponding to the second data without changing a physical address of a physical area where the first data is stored and a physical address of a physical area where the second data is stored.

2. The storage system according to claim 1, wherein each of the plurality of storage devices is configured to have a physical storage medium having a plurality of physical areas,
the logical space is configured to have a plurality of logical areas,
each of the plurality of storage devices is configured to have a medium controller configured to manage correspondence relations between the physical areas and the logical areas,
the storage controller is configured to transmit, to the storage device, an exchange instruction designating the logical address corresponding to the first data and a logical address corresponding to the second data when the result of the first determination is affirmative,
the medium controller of the storage device that has received the exchange instruction is configured to execute a intra-device exchange process, and
the intra-device exchange process is a process configured to eliminate need for migration of both the first data and the second data, and includes:
a process of allocating, instead of a first physical area allocated to a first logical area to which a logical address corresponding to the first data belongs, a second physical area allocated to a second logical area to which a logical address corresponding to the second data belongs, to the first logical area; and
a process of allocating, instead of the second physical area, the first physical area to the second logical area.

3. The storage system according to claim 2, wherein the plurality of storage devices are configured to form a RAID group configured to use parities generated based on two or more data,
the logical space is configured to be divided into a plurality of stripe groups to which respective logical areas belong,
the plurality of logical areas provided in each of the plurality of stripe groups is configured to store two or more data and a predetermined number of parities, and
the medium controller of the storage device that has received the exchange instruction is configured to generate intermediate parities used to update the parities in the stripe group to which the first logical area belongs and the parities in the stripe group to which the second logical area belongs, based on the first data and the second data.

4. The storage system according to claim 3, wherein when the result of the first determination is negative,
the medium controller in the second storage device is configured to generate intermediate parities used to update the parities in the stripe group to which the second logical area belongs, based on the second data and the first data, and
the medium controller in the first storage device is configured to generate intermediate parities used to update the parities in the stripe group to which the first logical area belongs, based on the first data and the second data.

5. The storage system according to claim 3, wherein the storage controller is configured to have a memory,
the intermediate parities generated by the respective storage devices are configured to be stored in the memory, and
the storage controller is configured to transmit to the storage device using one command a plurality of intermediate parities of the plurality of intermediate parities stored in the memory, which are to be transmitted to the same storage device.

6. The storage system according to claim 4, wherein the storage controller is configured to transmit, to the storage device having generated the intermediate parities, transmission destination information indicative of a transmission destination storage device which is included in the RAID group including the storage device and to which the intermediate parities generated by the storage device are transmitted, and
the medium controller of the storage device that has received the transmission destination information is configured to transmit, the intermediate parities generated by the storage device to the storage device indicated by the received transmission destination information without mediation of the storage controller.

7. The storage system according to claim 3, wherein a physical storage medium in each of the plurality of storage devices is configured to have a NAND flash memory,
the storage controller is configured to be coupled to an external apparatus to receive a defragmentation command for the logical space from the external apparatus thereby executing a defragmentation process in response to the defragmentation command,
the storage controller is configured to make the first determination for each set of the first data and the second data in the defragmentation process,
the storage controller is configured to transmit, when a result of the first determination is negative, a request to at least one of the first storage device in which the first data is stored and the second storage device in which the second data is stored, thereby executing an inter-device exchange process, and
the inter-device exchange process is a process that needs migration of both the first data and the second data, and includes:
a process in which the first data is read from a physical area in the first storage device and written to a physical area in the second storage device,
a process in which, instead of a physical area where the second data is stored, a physical area to which the first data is to be written is allocated to the second logical area by the medium controller in the second storage device,
a process in which the second data is read from a physical area in the second storage device and written to a physical area in the first storage device, and
a process in which, instead of a physical area where the first data is stored, a physical area to which the second data is to be written is allocated to the first logical area by the medium controller in the first storage device.

8. The storage system according to claim 7, wherein the storage controller is configured to be coupled to an external apparatus,
the storage controller is configured to further include first management information including information on data exchange in the same storage device and second management information including information on data exchange between different storage devices,
the storage controller is configured to:
receive an exchange request to exchange the first data for the second data from the external apparatus,
register a set of a logical address corresponding to the first data and a logical address corresponding to the second data in the first management information when, in a process executed in response to the exchange request, the result of the first determination is affirmative,
register the set of the logical address corresponding to the first data and the logical address corresponding to the second data in the second management information when, in the process executed in response to the exchange request, the result of the first determination is negative,
transmit a completion response to the exchange request,
transmit the completion response to the external apparatus, and then transmit an instruction related to the intra-device exchange process to a storage device in which data registered in the first management information is stored, and
transmit an instruction related to the inter-device exchange process to at least one storage device in which data registered in the second management information is stored.

9. The storage system according to claim 8, wherein the storage controller is configured such that, when a write request intended for the first logical area is received from the external apparatus and the first logical area is registered in one of the first management information and the second management information, the storage controller executes a write process for the write request after an exchange process between the first logical area and the second logical area is completed.

10. The storage system according to claim 8, wherein the storage controller is configured to read data on the second logical area with which the first logical area is to be exchanged when a read request intended for the first logical area is received from the external apparatus and the first logical area is registered in one of the first management information and the second management information.

11. The storage system according to claim 3, wherein the storage controller makes a second determination to determine whether the storage controller is to generate updated parities for the stripe group to which the first logical area belongs or determine whether to cause the medium controller in the storage device having transmitted the exchange instruction to generate the intermediate parities, and
the medium controller in the storage device having received the exchange instruction determines whether or not to generate the intermediate parities based on a result of the second determination by the storage controller.

12. The storage system according to claim 1, wherein each of the plurality of storage devices is configured to have a physical storage medium having a plurality of physical areas,
each of the plurality of storage devices is configured to manage correspondence relations between physical areas and logical areas,
the storage controller is configured to:
manage a first virtual volume and a second virtual volume each of which is a virtual logical volume and which has a plurality of virtual areas,
a first virtual area belonging to the first virtual volume and a second virtual area belonging to the second virtual volume both reference a first logical area that is one of the plurality of logical areas, and
the storage controller is configured to copy a logical address of the first logical area to a second logical area that is one of the plurality of logical areas and to change a reference source of the second virtual area to the second logical area when the storage controller receives a write request for the first virtual area from the external apparatus.

13. A storage control method comprising:
managing correspondence relations between physical addresses and logical addresses in a storage device;
managing a logical space that is a space based on a plurality of sub logical spaces provided by a plurality of storage devices;
when first data that is one of a plurality of data in the logical space is exchanged for second data that is one of the plurality of data, making a first determination to determine whether or not the first data and the second data are stored in the same storage device, and
when a result of the first determination is affirmative, replacing, in the storage device, a logical address corresponding to the first data to a logical address corresponding to the second data without changing a physical address of a physical area where the first data is stored and a physical address of a physical area where the second data is stored.

* * * * *